US012693443B1

(12) United States Patent
Vlasov et al.

(10) Patent No.: US 12,693,443 B1
(45) Date of Patent: Jul. 28, 2026

(54) FULL WAVEFORM INVERSION ALGORITHM FOR SUBSURFACE PHYSICAL PROPERTY RECONSTRUCTION USING GENERATIVE DEEP LEARNING APPROACH

(71) Applicant: ENGISCENT PTE. LTD., Singapore (SG)

(72) Inventors: Alexander Vlasov, Bishkek (KG); Dmitry Mikhailov, Otuz-Adyr (KG)

(73) Assignee: ENGISCENT PTE. LTD., Singapore (SG)

( * ) Notice: Subject to any disclaimer, the term of this patent is extended or adjusted under 35 U.S.C. 154(b) by 441 days.

(21) Appl. No.: 18/519,197

(22) Filed: Nov. 27, 2023

Related U.S. Application Data

(60) Provisional application No. 63/428,214, filed on Nov. 28, 2022.

(51) Int. Cl.
| | |
|---|---|
| *G01V 1/28* | (2006.01) |
| *G01V 1/30* | (2006.01) |
| *G01V 1/34* | (2006.01) |
| *G06N 3/08* | (2023.01) |

(52) U.S. Cl.
CPC ................ *G01V 1/282* (2013.01); *G01V 1/30* (2013.01); *G01V 1/345* (2013.01); *G06N 3/08* (2013.01)

(58) Field of Classification Search
None
See application file for complete search history.

(56) References Cited

U.S. PATENT DOCUMENTS

2013/0163376 A1* 6/2013 Poole .................. G01V 1/3808
367/24
2013/0163379 A1* 6/2013 Poole ..................... G01V 1/36
367/24

OTHER PUBLICATIONS

Saraiva, Marcus, et al. "Data-driven full-waveform inversion surrogate using conditional generative adversarial networks." 2021 International joint conference on neural networks (IJCNN). IEEE, 2021. (Year: 2021).*
Cao, Danping, Yan Jia, and Rongang Cuia. "VSP wavefiled separation using GAN base on asymmetric convolution blocks." SEG International Exposition and Annual Meeting. SEG, 2021. (Year: 2021).*

(Continued)

*Primary Examiner* — Raymond L Nimox
(74) *Attorney, Agent, or Firm* — Bardmesser Law Group

(57) ABSTRACT
The inverse problem in seismic exploration is addressed by leveraging both the Radon transform and deep learning techniques to reconstruct subsurface properties from seismic data. The method encompasses a workflow that employs Generative Adversarial Networks (GANs) alongside specialized neural network architectures called R-nets. The first R-net efficiently handles hyperbolic Radon Transform, aiding in data preprocessing, while the second R-net generates detailed subsurface models. These reconstructed properties include the velocity of pressure wave propagation, velocity of shear wave propagation, impedance, and density. This novel approach significantly enhances the accuracy and efficiency of the reconstruction process, particularly beneficial for pre-stack depth migration. The use of both Radon transform and generative deep learning greatly reduces the time and resources traditionally needed for depth-velocity model construction, leading to the generation of superior subsurface models faster.

18 Claims, 36 Drawing Sheets

(56) References Cited

OTHER PUBLICATIONS

Adler, Amir, Mauricio Araya-Polo, and Tomaso Poggio. "Deep learning for seismic inverse problems: Toward the acceleration of geophysical analysis workflows." IEEE signal processing magazine 38.2 (2021): 89-119. (Year: 2021).*

* cited by examiner

Vertical Plane

Horizontal Plane

FULL WAVEFORM INVERSION ALGORITHM FOR SUBSURFACE PHYSICAL PROPERTY RECONSTRUCTION USING GENERATIVE DEEP LEARNING APPROACH

BACKGROUND

Due to the increase in the use of large computing power in the processing and interpretation of seismic data over the past decade, the seismic industry has become one of the main consumers of computer technology. Seismic data processing is a combination of mathematical signal processing methods with the subjective interpretation of geophysicists. Its purpose is to convert the data obtained in the field into a coherent section, reflecting the pattern of the occurrence of the main geological horizons in the earth.

There are two types of seismic waves: body waves and surface waves. Body waves travel within solids and fluids, and surface waves travel along the free surface and interfaces between layers with strong velocity contrast.

The earth can be mechanically considered as an elastic body, where pressure waves (P-waves) and transverse waves (S-waves) are generated as a result of the propagation of the initial disturbance, for example, using a vibration or dynamite explosion (FIG. 1).

FIG. 1 illustrates land acquisition example with vibroseis. On the surface, a machine with a large hydraulic plate continuously impacts the ground, gradually increasing the frequency of the plate's vibration. This can last from 5 to 25 seconds depending on the environment and seismic objectives 101. Elastic waves propagate in the medium and are reflected at the boundary of acoustically contrasting layers. In the environment, as a rule, there are key boundaries, the response from which is especially important 102. Seismic receivers are placed on the surface, which in turn register incoming waves 103. Mechanical vibrations are converted into electrical impulses and transmitted to a seismic station where they are recorded on a magnetic medium 104.

Seismic surveys can also be carried out in offshore areas. In the aquatic environment, a cluster of pneumatic guns is used to excite elastic vibrations (FIG. 2).

FIG. 2A shows an example of a geologic environment (e.g., an environment that includes a sedimentary basin, a reservoir, one or more fractures, etc. and an example of an acquisition technique to acquire seismic data. As an example, a system may process data acquired by the technique, for example, to allow for direct or indirect management of sensing, drilling, injecting, extracting, etc., with respect to the geologic environment. In turn, further information about the geologic environment may become available as feedback (e.g., optionally as input to the system).

FIG. 2B shows an example of a geologic environment that includes a seabed and a sea surface. As shown, equipment such as a ship may tow an energy source and a string of sensors at a depth below the sea surface (e.g., one or more streamers, etc.). In such example, the energy source may emit energy at a time 221, a portion of that energy may be reflected from the seabed at a time 222 and a portion of that reflected energy may be received at the string of sensors at a time 223.

Different types of seismic waves exhibit distinct trajectories of movement through the Earth's subsurface (FIGS. 3A, 3B). FIG. 3A illustrates the polarizations of different wave types in the vertical plane, showcasing P-waves (301), SV-waves (302), and Rayleigh-waves (303). FIG. 3B illustrates the polarizations of different wave types in the horizontal plane, showcasing P-waves (304), SH-waves (305), and Rayleigh-waves (306).

The subsurface medium is characterized by several parameters, essential for seismic exploration. These include the commonly used pressure wave velocity, shear wave velocity, and density. Additionally, the acoustic impedance is determined by multiplying the medium's density with its pressure wave velocity. Beyond these fundamental parameters, the attenuation quality factor and anisotropy parameters also play significant roles in capturing the intricacies of the subsurface medium, offering deeper insights into its behavior and properties in response to seismic waves.

Conventional processing of reflection seismic data (oil and gas seismic exploration in a frequency range of approximately 1 Hz to approximately 250 Hz) yields an earth image represented by a seismic section, which is usually displayed in time.

Often, to reduce computation time, the earth model is simplified to 2D or 3D representations and is assumed to be an acoustically elastic body, in which only P-waves are considered useful, and the rest of the waves are treated as noise. The seismic trace in practice contains, in addition to the signal, interfering components: multiple reflections, regular noise, and irregular (random) noise (FIG. 4).

FIG. 4 illustrates an example of a real common shot point gather sorted by shot-to-offset. Several types of events can be registered during the seismic acquisition process. In the land case, ground roll is well presented 401, as are linear noise represented by refraction waves 403 and normal reflections, which are key for the image 402. Using different processing scenarios and sorts, all negative events in the gather can be eliminated.

Seismic time records are composed of individual traces, each of which represents a graph of the amplitude of a seismic signal as it varies over time, starting from the activation of the seismic source. In the simplest scenarios, the amplitude can represent either pressure changes in marine environments or vertical ground velocity on land. However, advanced recording techniques allow for the capture of more than just a single component of the seismic wavefield. Utilizing sophisticated 3-component receivers on land or ocean-bottom nodes in marine settings, it's possible to measure all three components of the seismic wavefield. This multi-component data provides a richer understanding of subsurface properties, enabling not only the determination of pressure wave propagation velocity but also the velocity of shear waves, as well as seismic impedance and density.

While there are numerous geophysical methods available for obtaining geological information, the seismic reflection method based on the common midpoint (CMP) technique stands as the industry leader in oil and gas exploration. This method has been extensively developed and is particularly valued for its ability to improve signal quality through redundancy, measured as the fold of coverage in seismic experiments. Within this paradigm, there are a multitude of approaches and algorithms employed.

In the realm of seismic data collection, it's common practice to initially gather data using shot-receiver coordinates, as illustrated in FIG. 4. In this setup, each gather comprises all the traces recorded for a single seismic shot. However, the standard approach for processing this data involves a transition to midpoint-offset coordinates, depicted in FIG. 5. This shift is facilitated by reorganizing the data into what are known as Common Midpoint (CMP) gathers. In this arrangement, each individual seismic trace is allocated to the midpoint between its corresponding shot and receiver locations. Traces that share the same midpoint are then bundled together to form a CMP gather. Within each gather, the traces are further sorted based on their offset values, which represent the distances between the source and receiver for each trace. While the terms "Common Depth Point" (CDP) and "Common Midpoint" (CMP) are sometimes used as if they are synonymous, it's important to note that this usage is not technically accurate.

Delving into FIGS. 6A-6D, a clear distinction is drawn between common shot point and common midpoint sorting techniques. FIG. 6A showcases the common shot point sorting method, with the common shot point referenced as 601. All seismic raypaths for traces originate from this point, displaying trajectories that form the seismic gather for this method. Turning to FIG. 6B, it details the common midpoint sorting technique, with the common midpoint labeled as 602. Seismic raypaths in this figure are reflected at this common midpoint. These trajectories form the seismic gather under this sorting, and in cases with horizontal subsurface borders, this midpoint aligns with the depth point. FIG. 6C represents reflection traveltime curves corresponding to a single subsurface border in common shot point (CSP) sorting. This figure highlights how reflection events appear when the reflecting interface is horizontal. The horizontal border and its corresponding reflection curve are depicted as solid lines, labeled as 603. However, when the interface dips, the hyperbola skews updip. Both the dipped border and its skewed reflection are depicted as dotted lines, referenced as 604. FIG. 6D illustrates traveltime curves for a single subsurface border in common midpoint (CMP) sorting. Notably, the solid reflection curve, labeled as 605, and the dotted reflection curve, labeled as 606, both have their apex situated at the common midpoint (602). This representation emphasizes that the apex of the reflection hyperbola consistently appears at the center or zero offset, irrespective of the interface orientation. This feature underscores the usefulness of CMP-sorting in seismic data processing.

Interval velocity and RMS (Root Mean Square) velocity are fundamental concepts in the realm of seismic exploration, and they provide invaluable insights into subsurface properties. The interval velocity is defined as the average propagation velocity within a specified depth or time interval. Mathematically, it is calculated by dividing the thickness of the depth interval by the corresponding vertical travel time through that interval. On the other hand, the RMS velocity is a more comprehensive metric, encompassing velocities of all layers up to a given depth. Specifically, the RMS velocity up to the base of the Nth layer is derived from the square root of the average of the squared velocities of all layers above and including the Nth layer. This velocity can be deduced directly from the curvature of the reflection hyperbola, especially at proximate offsets. It's worth noting that while RMS velocity offers an aggregated measure across multiple layers, interval velocity offers a more granular, layer-specific insight and is the closest approximation to the true velocity within a specific depth or time range in seismic exploration.

One of the sophisticated methods that can be employed on CMP gathers for advanced seismic data processing is the Radon Transform. This mathematical framework is versatile, serving various purposes such as isolating normal reflections from multiples, deblending of simultaneous sources, and filling in gaps in missing seismic data.

The Radon Transform works by performing integration along designated curves, thereby converting the data into a different parameter space. Among its various forms—linear, parabolic, and hyperbolic—the hyperbolic Radon Transform is often the most apt for seismic applications. Its prominence arises from its ability to match the hyperbolic trajectories seen in reflection events in prestack gathers, which inherently derive from velocity variations. As illustrated in FIG. 7, the hyperbolic Radon Transform not only matches these trajectories but also inherently captures valuable velocity information within its transformed data.

However, the hyperbolic Radon Transform is not without its challenges. It is computationally demanding and time-variant, which makes it less straightforward to implement than its time-invariant counterparts. The computational complexity is often on the order of O (Nt*Nx*Np), where Nt, Nx, and Np denote the dimensions of time, space, and slowness axes, respectively. This becomes a significant hurdle when working with extensive data sets.

Despite these obstacles, the hyperbolic Radon Transform remains an invaluable asset in seismic data processing. Its application to CMP gathers can substantially elevate the quality of the resulting seismic images. This makes it a subject of continual research and innovation in geophysics.

It's worth noting that emerging technologies like neural networks offer promising avenues for enhancing the processing steps of the hyperbolic Radon Transform. Given that the transform inherently contains velocity information, its output can serve as a particularly effective input for neural networks designed to generate velocity models.

The properties of the geological environment (such as velocity and density, impedance, etc.), which can affect how much energy from a given type of source can penetrate into earth's interior, are important, and the Full waveform inversion (FWI) method has proven itself well to take into account these parameters.

Full Waveform Inversion (FWI) is a seismic inversion technique that uses pre-stack seismic data (raw seismic or preprocessed data) to obtain a detailed interval velocity model (FIG. 8).

FWI stands as a high-resolution seismic inversion method, conventionally used to harness the complete seismic wavefield in deriving a detailed interval velocity model, exemplified in FIG. 8.

FIG. 8 lays out a schematic of the traditional FWI process. The inversion procedure progresses methodically: 1) 801—creating an initial seismic model utilizing established model-building methodologies; 2) 802—generating synthetic wavefields based on this initial model; 3) 803—systematically comparing these synthetic wavefields with real recorded wavefields to derive an error function, capturing the misfit; 4) 804—iteratively updating and optimizing the velocity model to minimize this misfit, ensuring the synthetic wavefields align more closely with the actual recorded data.

To generate synthetic seismic data, FWI uses an initial low-resolution velocity model as input. The process is performed prior to stacking using numerical wave equation simulations. The resulting model is then compared with real seismic data. With each successive iteration, FWI updates this velocity model to minimize the difference between real and synthetic data.

Seismic data migration is a pivotal procedure in seismic data processing, with the primary objective of positioning a seismic event accurately within the subsurface. At the heart of this technique is the effort to rectify and enhance seismic data by eliminating distortions like diffractions, as well as addressing the tilt effects inherent in reflectors. Such distortions, if left unaddressed, can lead to inaccurate interpretations of the subsurface geological structures.

There exist different methodologies for migration, each tailored to specific seismic data attributes and the complexity of the geological structures under study. One of the most vital distinctions is between pre-stack and post-stack migration. Pre-stack migration is the process wherein seismic data is adjusted and refined prior to the stacking sequence. This is in contrast to post-stack migration, which operates on already stacked data, typically treated as zero-offset sections. Pre-stack migration, especially, offers superior outcomes when dealing with intricate subsurface features, such as conflicting dips structures or in situations where there is a notable reduction in energy from reflection points owing to side swipe.

Crucially, the efficacy and precision of the pre-stack migration process are profoundly contingent on the availability of an accurate subsurface pressure-wave velocity model. Without this model, the mapping of the seismic event to its genuine position in the subsurface could be fraught with inaccuracies. Thus, any advancements or enhancements in deriving a detailed and precise velocity model, as postulated in our patent, can significantly bolster the outcomes of the pre-stack migration, ensuring a more true-to-reality representation of the subsurface, which is of paramount importance for activities like hydrocarbon exploration.

In seismic exploration, the initial recordings of subsurface structures are predominantly in the time domain, representing the time taken for seismic waves to travel to a particular subsurface interface and return. However, geologists and reservoir engineers are primarily interested in the actual depths of these subsurface structures, as it directly influences decisions related to drilling, reservoir management, and overall exploration strategy. Thus, there exists a fundamental need to convert these time-based seismic records into depth measurements.

This transformation, known as Time-to-Depth Conversion, is imperative to derive meaningful insights from seismic data. It requires the utilization of interval velocity maps or, more specifically, the subsurface pressure wave velocity model. The velocity-depth ambiguity intrinsic to inversion can complicate this conversion, emphasizing the significance of an accurate velocity model. An erroneous velocity model can lead to depth misinterpretations, which can have costly implications in terms of drilling decisions and reservoir management. Hence, ensuring the accuracy of the velocity model, and by extension the time-to-depth conversion, is paramount for the success of any seismic exploration endeavor.

SUMMARY OF THE INVENTION

Accordingly, according to one embodiment, a method of full waveform seismic inversion includes storing, in a computer memory, geophysical data in the form of common midpoint (CMP)-sorted seismic time-series records obtained from a seismic survey of a subsurface region; employing a two-stage U-Net-like convolutional neural network architecture, that includes neural networks R-net1 and R-net2; training R-net1, implemented as a Generative Adversarial Network (GAN), to execute the hyperbolic Radon Transform on the CMP-sorted seismograms, using hyperbolic trajectories found in reflection events, thereby extracting RMS velocity data and reducing a dimensionality of the seismic time-series records; training R-net2, implemented as a Generative Adversarial Network (GAN), that processes Radon images that contain RMS velocities of pressure waves in the subsurface region, into a subsurface parameter model; and extracting, using a computer, a subsurface parameter model by processing the seismic time-series records using the trained R-net1 and R-net2.

In other embodiments, the method can include: 1. Development of a workflow for training neural networks with full-scale seismic data, which are characterized by a large volume, higher multiplicity and long record length, including onshore, offshore, and transition zone seismic data; 2. Development and programming of a neural network architecture for extracting features of the environment from the observed seismograms of common midpoint, after applying to the latter a specialty of the developed seismic data processing technology, which provides results higher than previously mentioned architectures and solutions in patents.

In the proposed method, a seismic migration algorithm can be added to validate the obtained velocities.

The method allows access to a trained generator network trained by generated seismic data and a discriminator network; receive seismic data from survey of the geological environment; and process at least a portion of the seismic data using the trained network of generators to generate the processed data.

In an embodiment, the method includes solving the inverse seismic problem by employing a comprehensive approach that integrates the Radon transform with advanced deep learning techniques. This involves the generation of seismogeological models and the application of analytical boundary setting methods, which are crucial for utilizing sections and cubes of environmental characteristics in the seismic data modeling process. The method also encompasses the creation of specialized neural network architectures, specifically designed for the pre-processing of industrial seismic data. These architectures facilitate robust model training and enable the expansion of dataset dimensions for enhanced training and algorithm validation. A key aspect of this approach is the use of a combined loss function, tailored for training large-scale neural networks in architectures such as Generative Adversarial Networks (GANs), capable of handling datasets exceeding 10 terabytes. Furthermore, the method incorporates software designed for the reconstruction of velocity models through Full Waveform Inversion, leveraging both the Radon transform and deep learning techniques. This integrated solution significantly streamlines the process of building depth-velocity models, reduces labor costs, and achieves an accurate representation of the subsurface environment. The resultant seismic data models are comparable in volume to those obtained from modern seismic surveys, offering enhanced accuracy and efficiency, particularly beneficial for pre-stack depth migration.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and, together with the description, serve to explain the principles of the invention.

Figure 4:
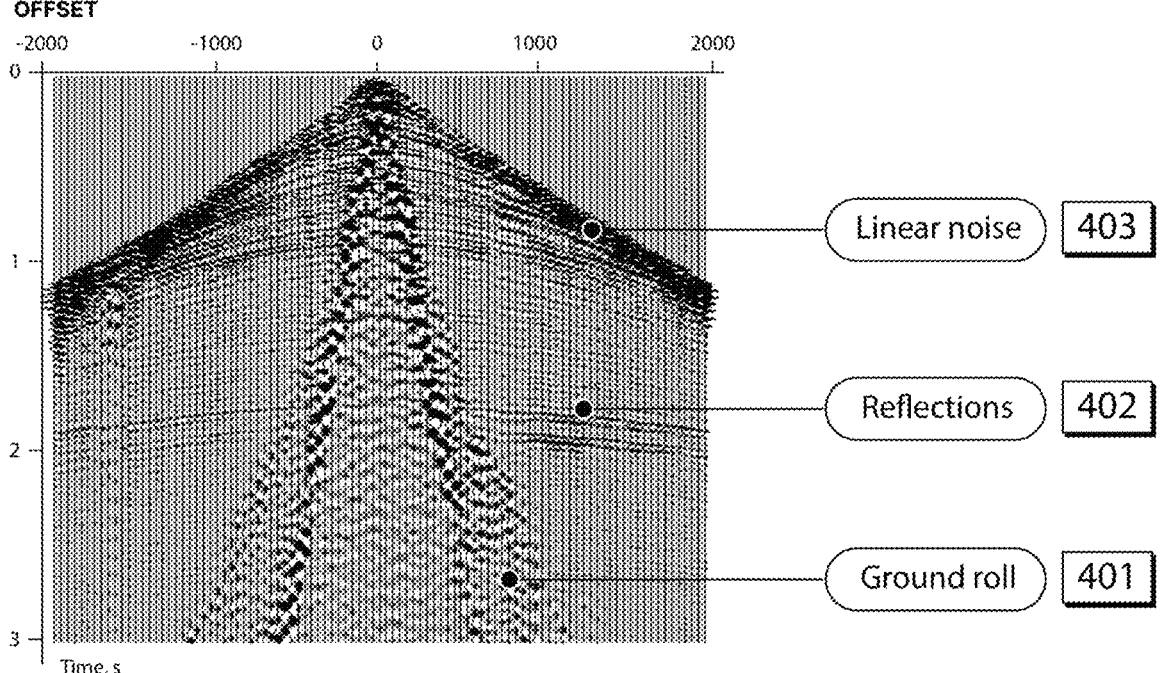

FIG. 4 displays a common shot gather, emphasizing multiple reflections, regular noise, illustrating the complexities in seismic data.

Figure 5:
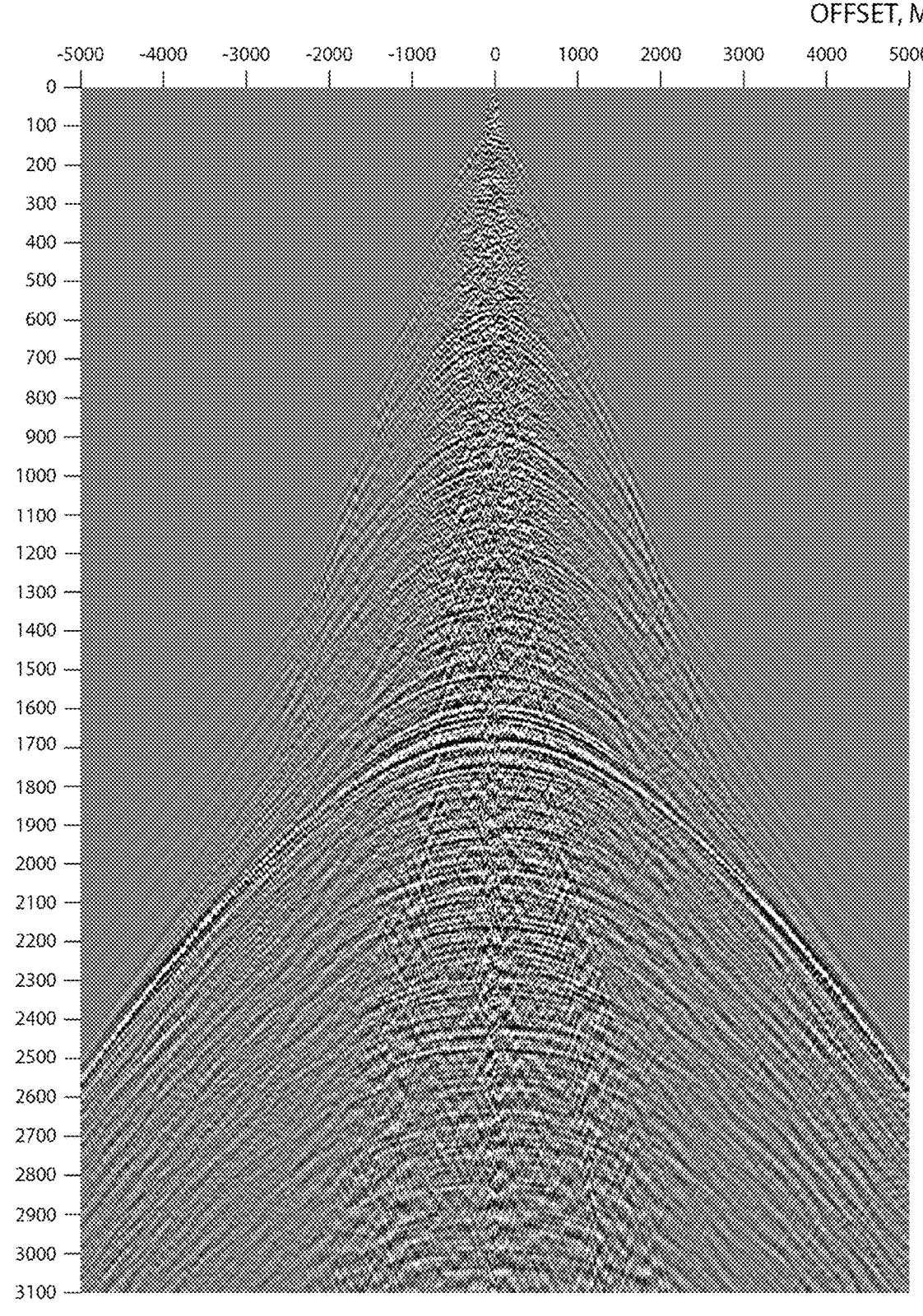
Figure 6A:
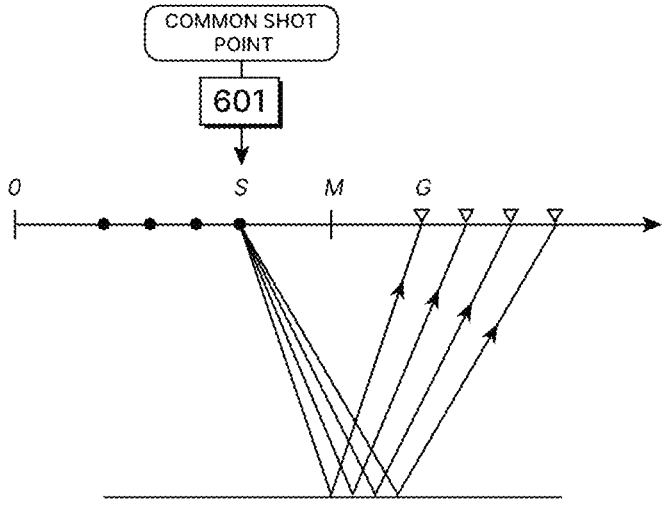
Figure 6B:
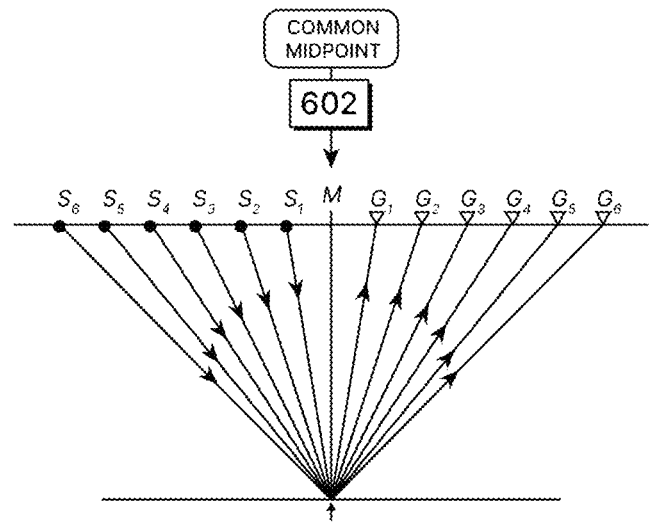
Figure 6C:
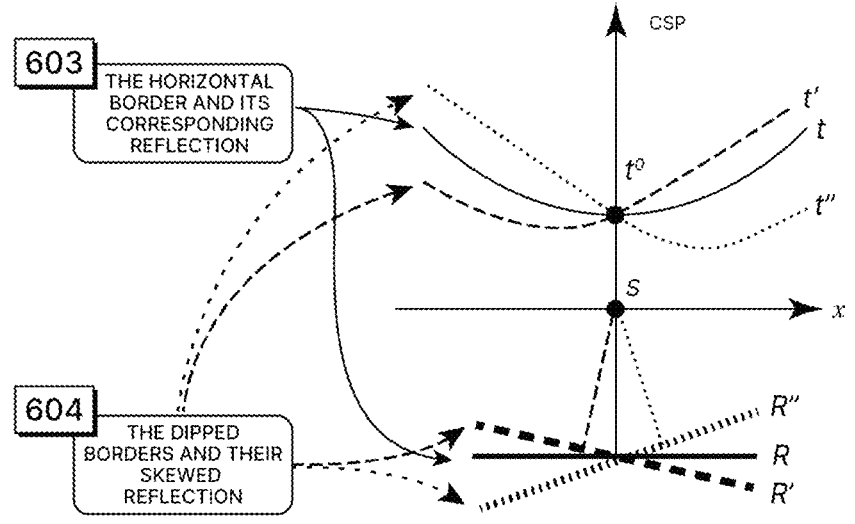
Figure 6D:
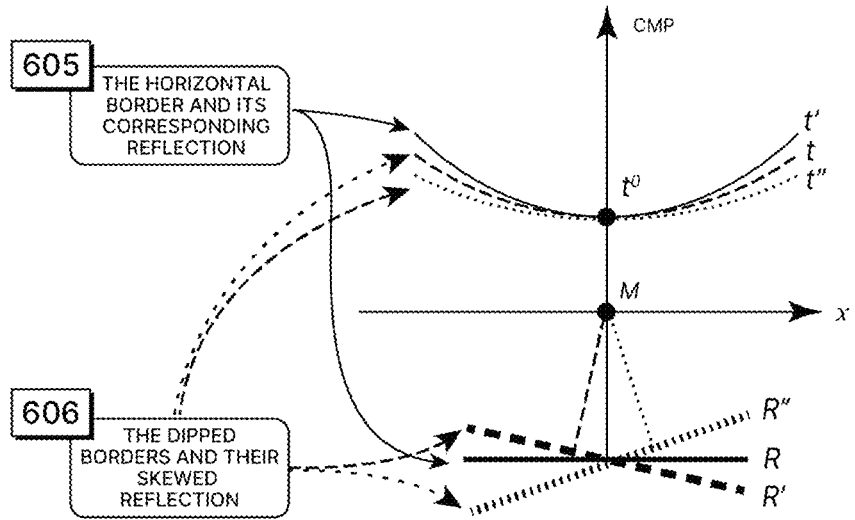

FIG. 5 presents a Common Midpoint (CMP) gather example, showcasing the organization of seismic traces based on their common midpoint.

FIGS. 6A-6D provide visual representations of common shot point sorting (FIG. 6A and FIG. 6C) and common midpoint sorting (FIG. 6B and FIG. 6D), highlighting the differences in seismic ray-path trajectories and reflection travel-time curves.

Figure 7:
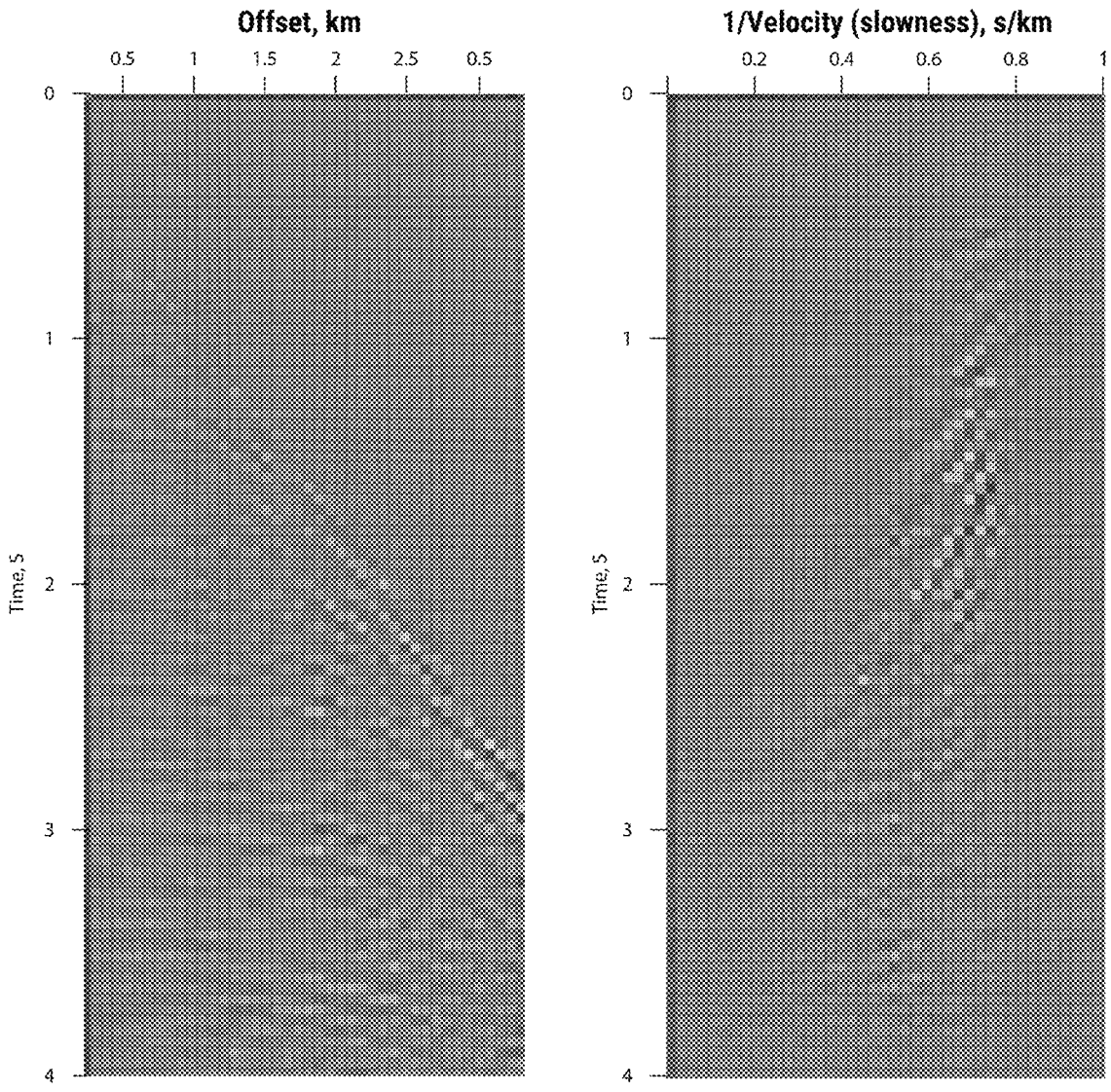

FIG. 7 illustrates the application of the hyperbolic Radon Transform to a Common Midpoint (CMP) gather, emphasizing its ability to extract hyperbolic reflection events within the seismic data.

Figure 8:
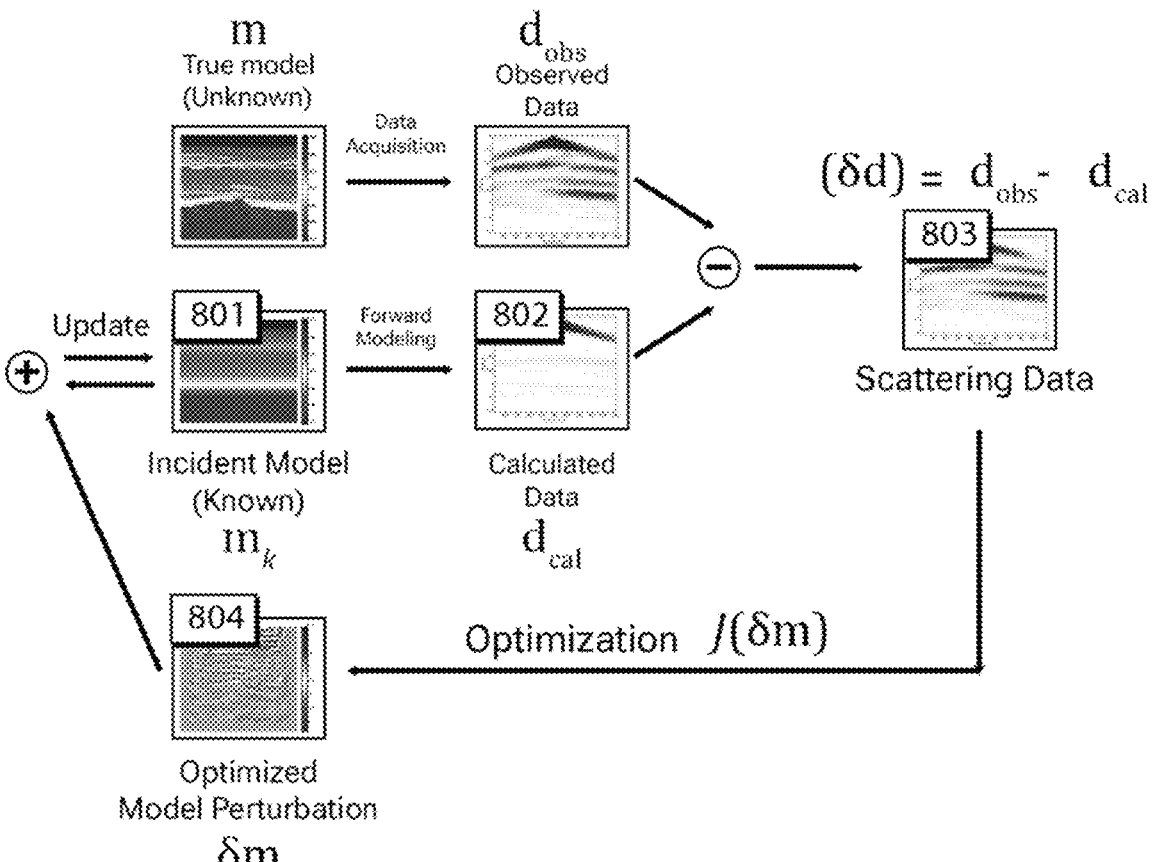

FIG. 8 offers a schematic representation of the Full Waveform Inversion (FWI) process.

Figure 9:
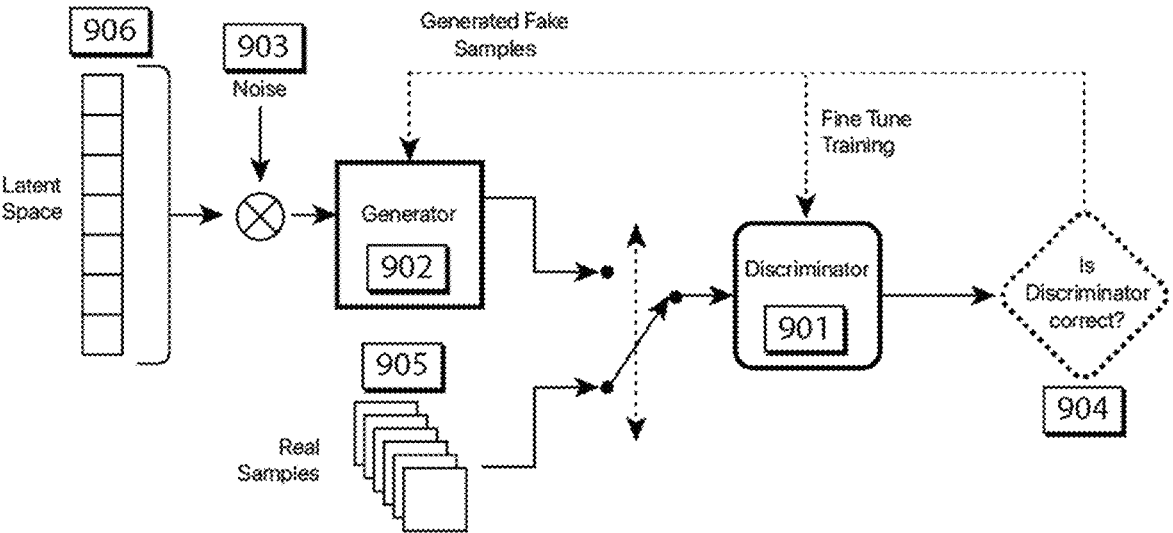

FIG. 9 illustrates an example of GAN training workflow.

Figure 10:
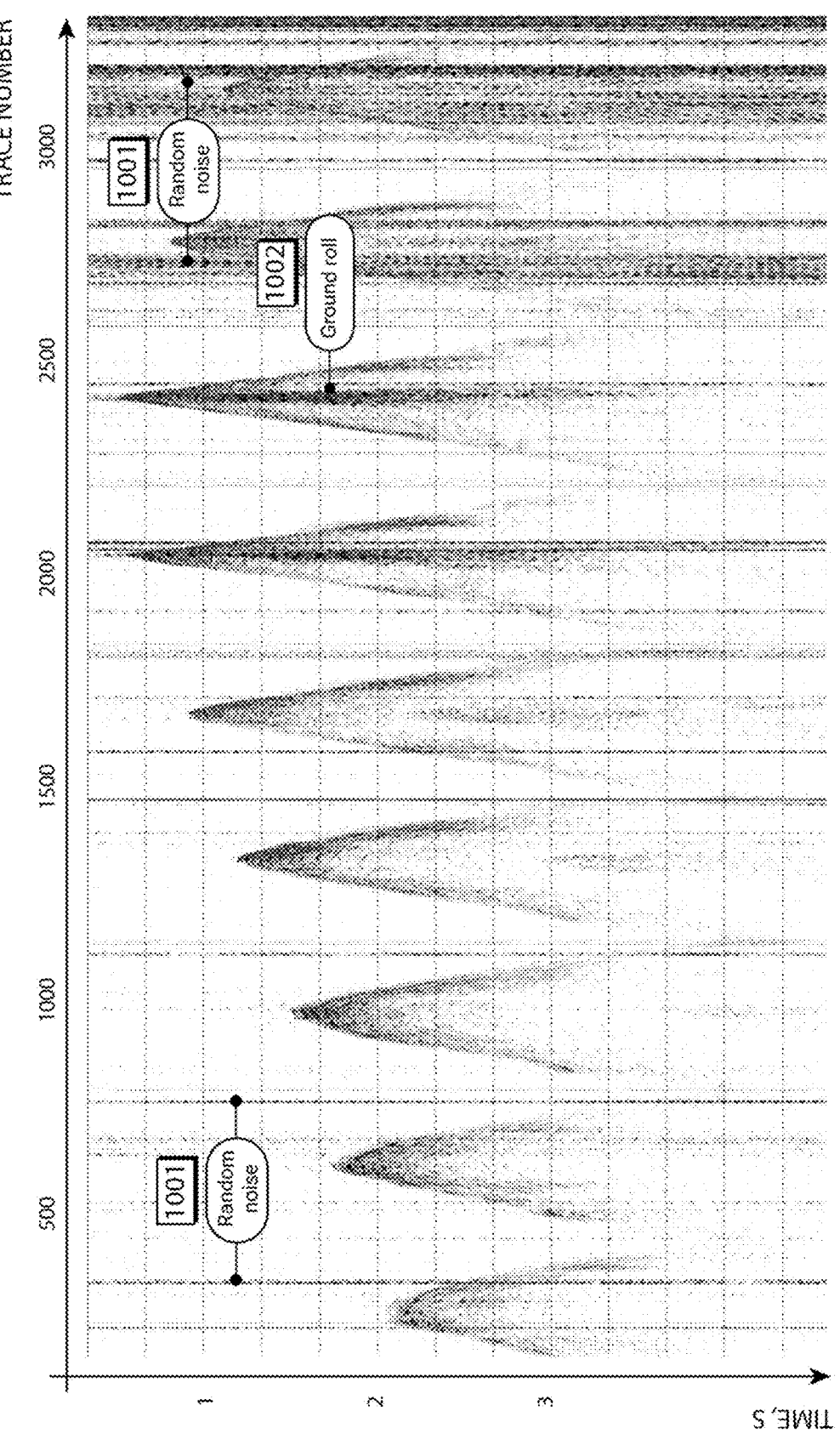

FIG. 10 provides an illustration of a series of common shot point gathers, showcasing random noise and ground roll.

Figure 11:
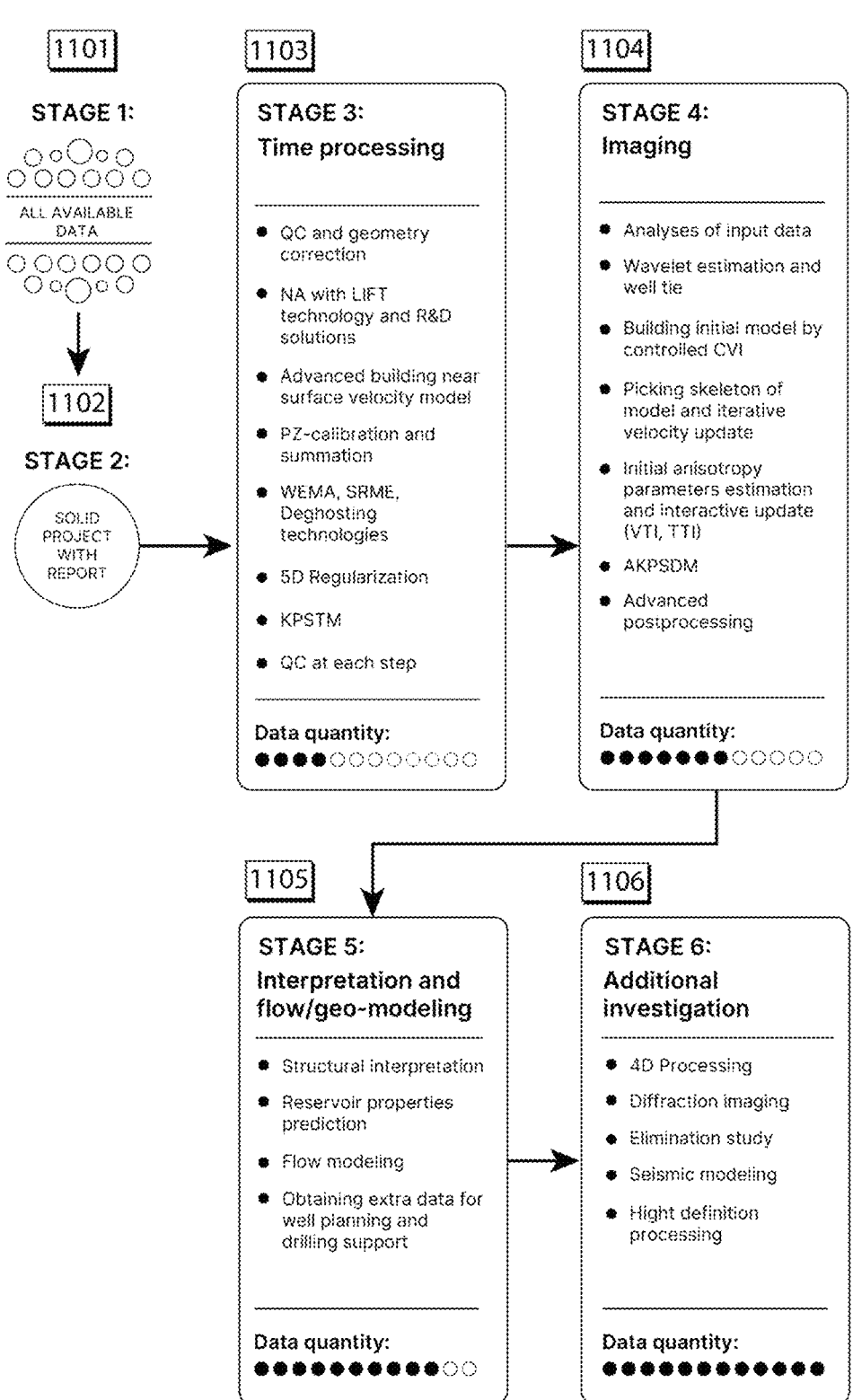

FIG. 11 illustrates an example of the seismic data processing stages the oil and gas industry using of artificial intelligence directly in the processes of managing the development of hydrocarbon (HC) deposits, building and using permanent models (hydrodynamic, geological, etc.).

Figure 12:
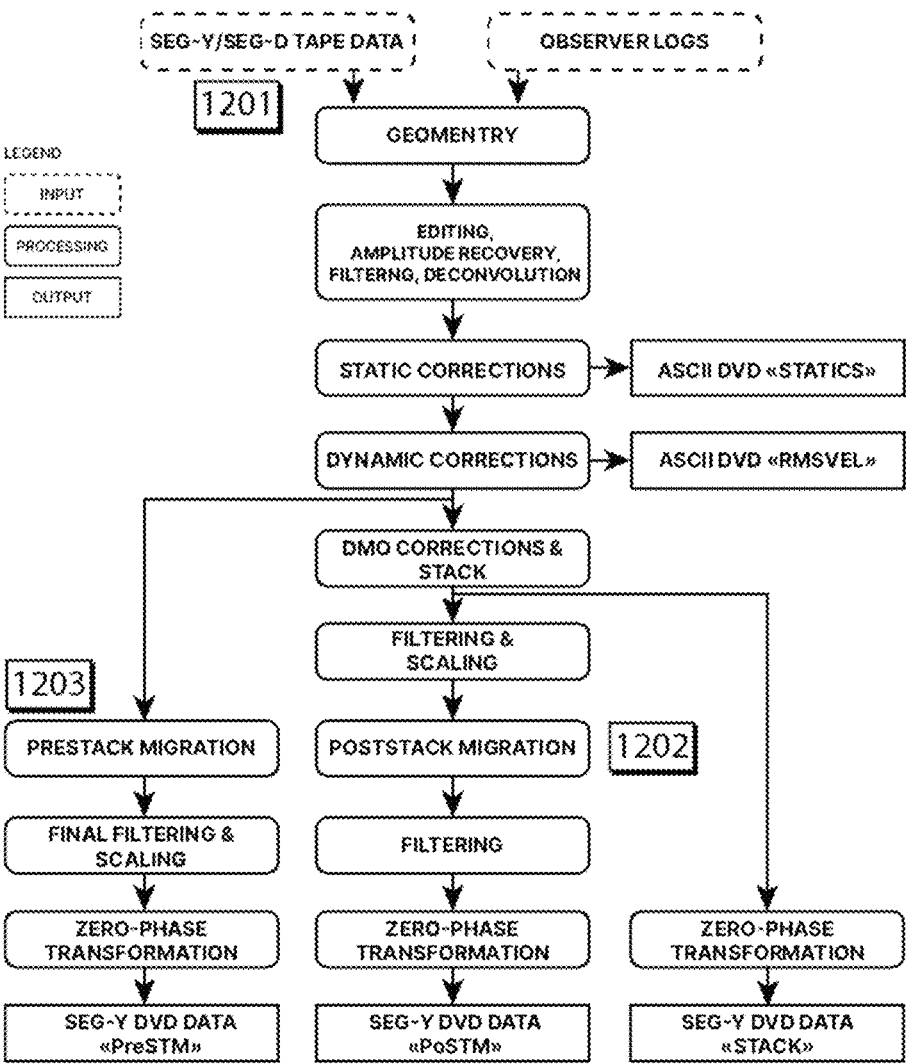

FIG. 12 illustrates an example of a chart of seismic time processing workflow.

Figure 13:
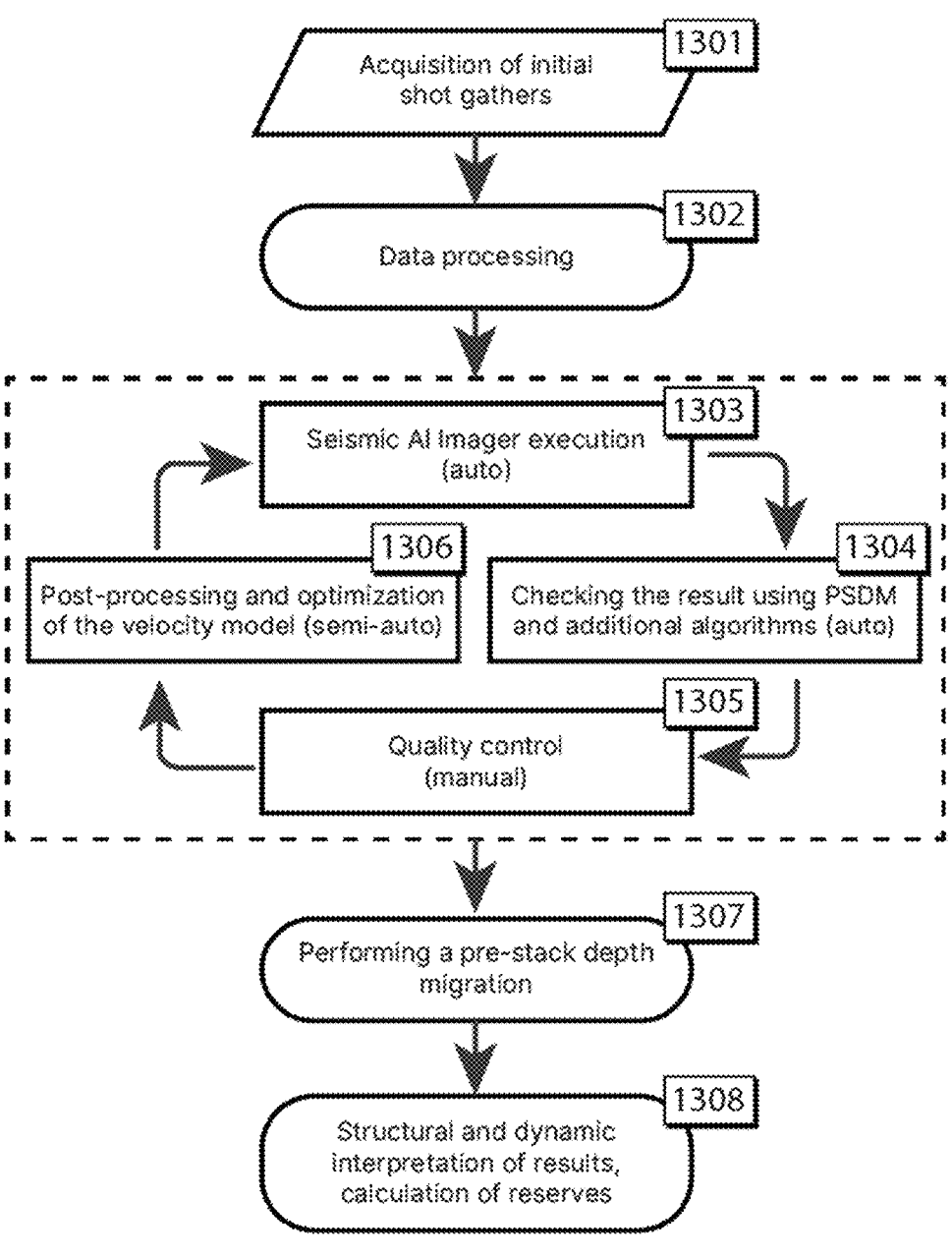

FIG. 13 illustrates an example of an overview scheme for building a depth-velocity model using full waveform inversion algorithm for subsurface physical property reconstruction using generative deep learning approach.

Figure 14A:
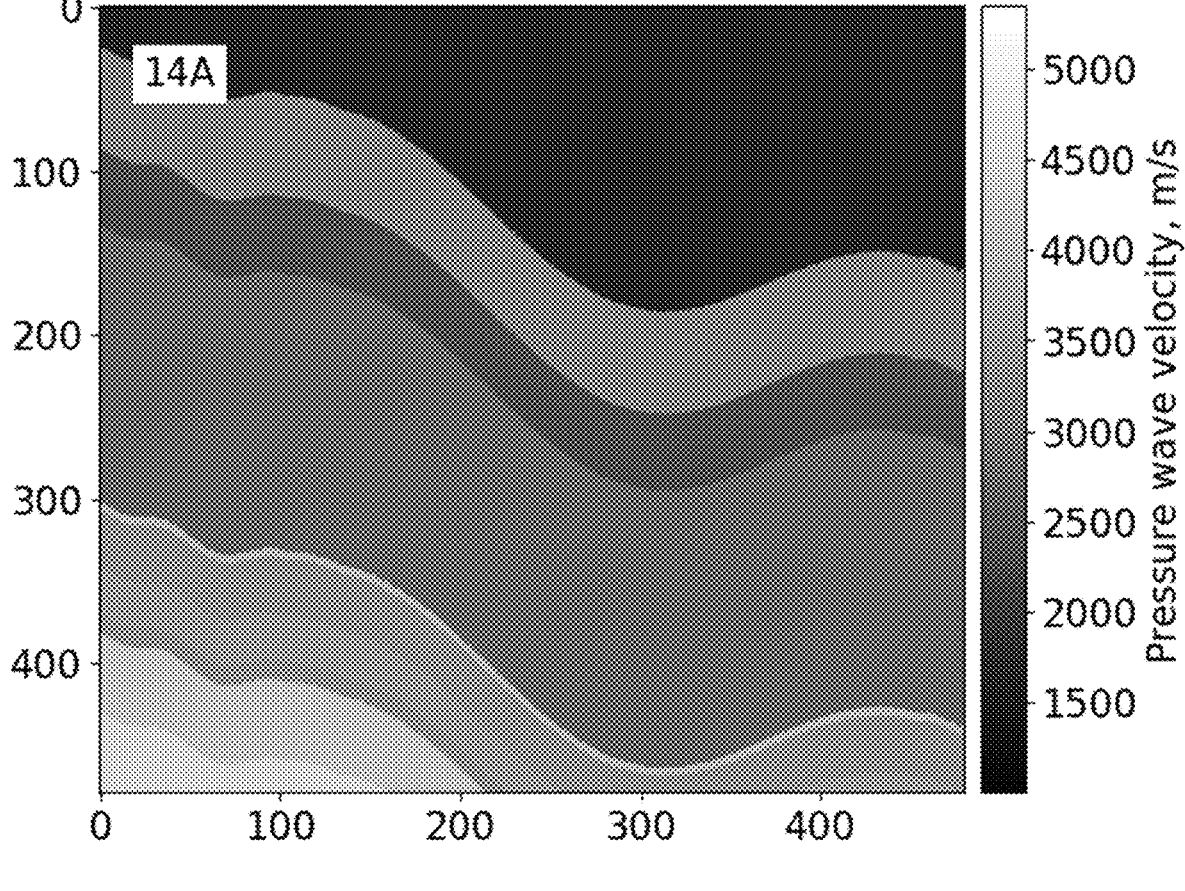
Figure 14B:
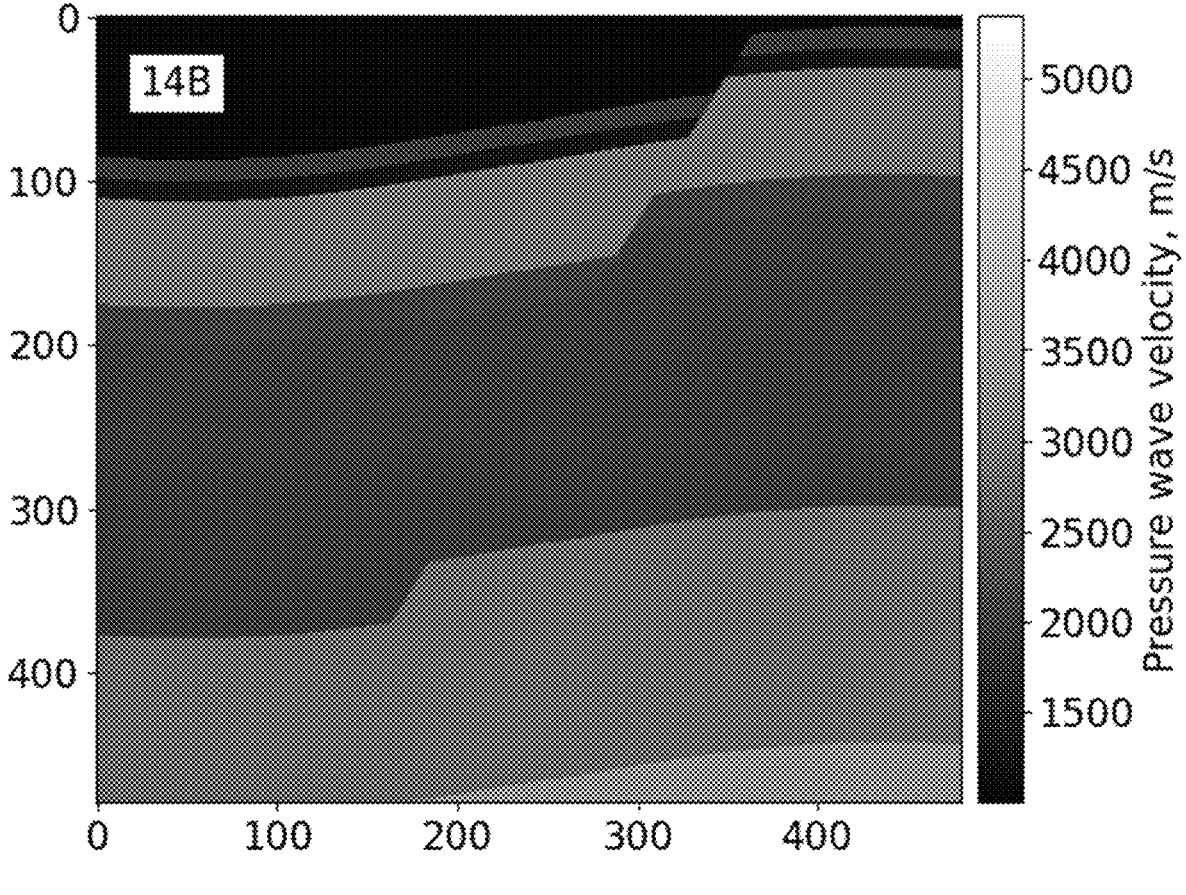
Figure 14C:
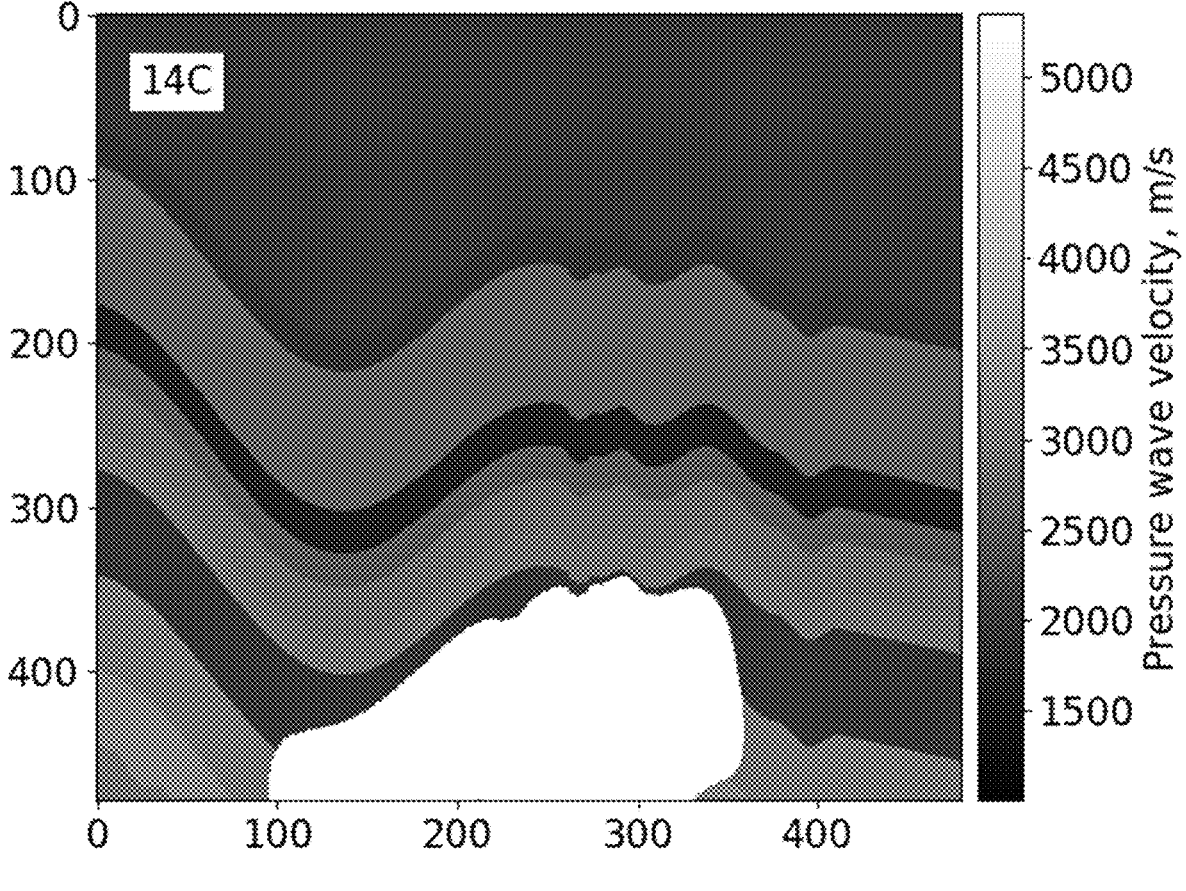
Figure 14D:
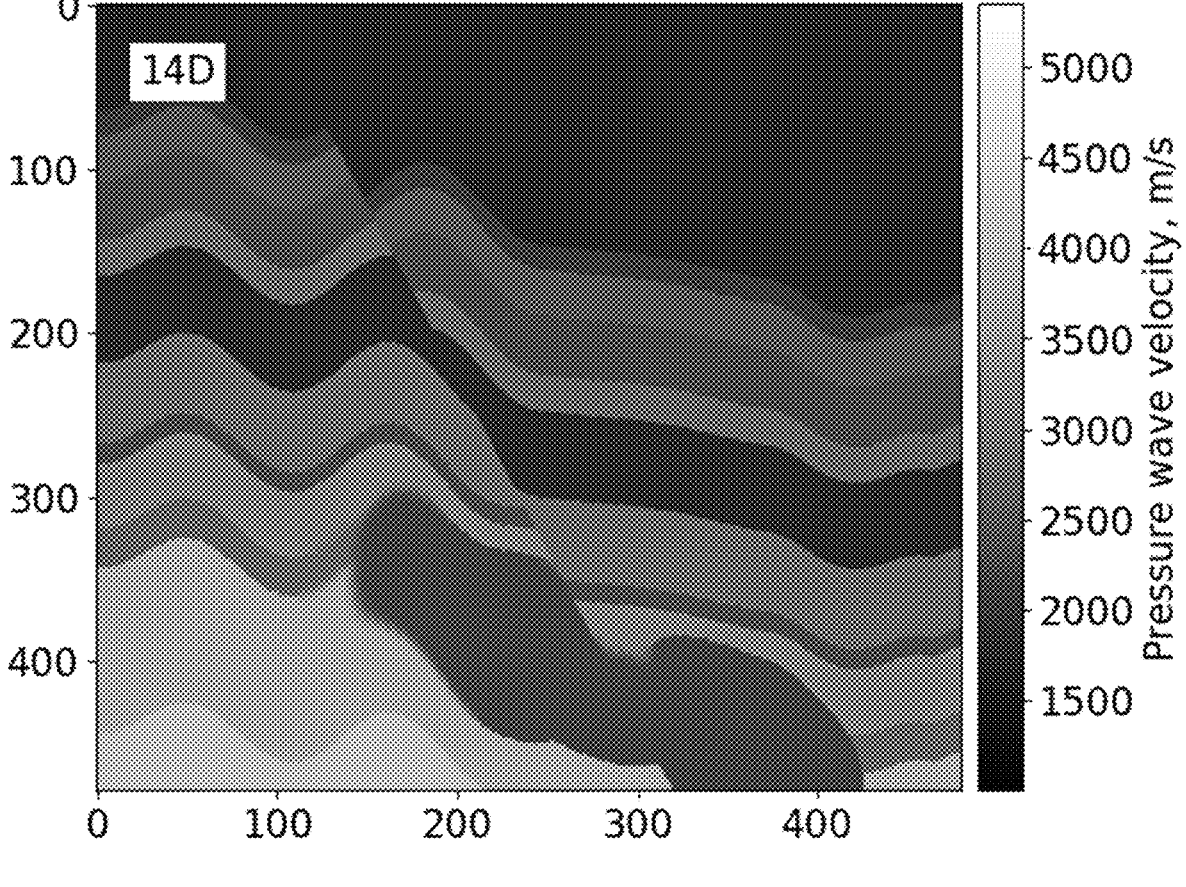

FIGS. 14A-14D illustrates an example selection of pressure wave velocity models used for the training of the neural network, featuring four geological scenarios: FIG. 14A) Layered, folded model;

FIG. 14B) Layered with a fault; FIG. 14C) Layered with an irregular geological body; FIG. 14D) Model with both a fault and an irregular geological body.

Figure 15A:
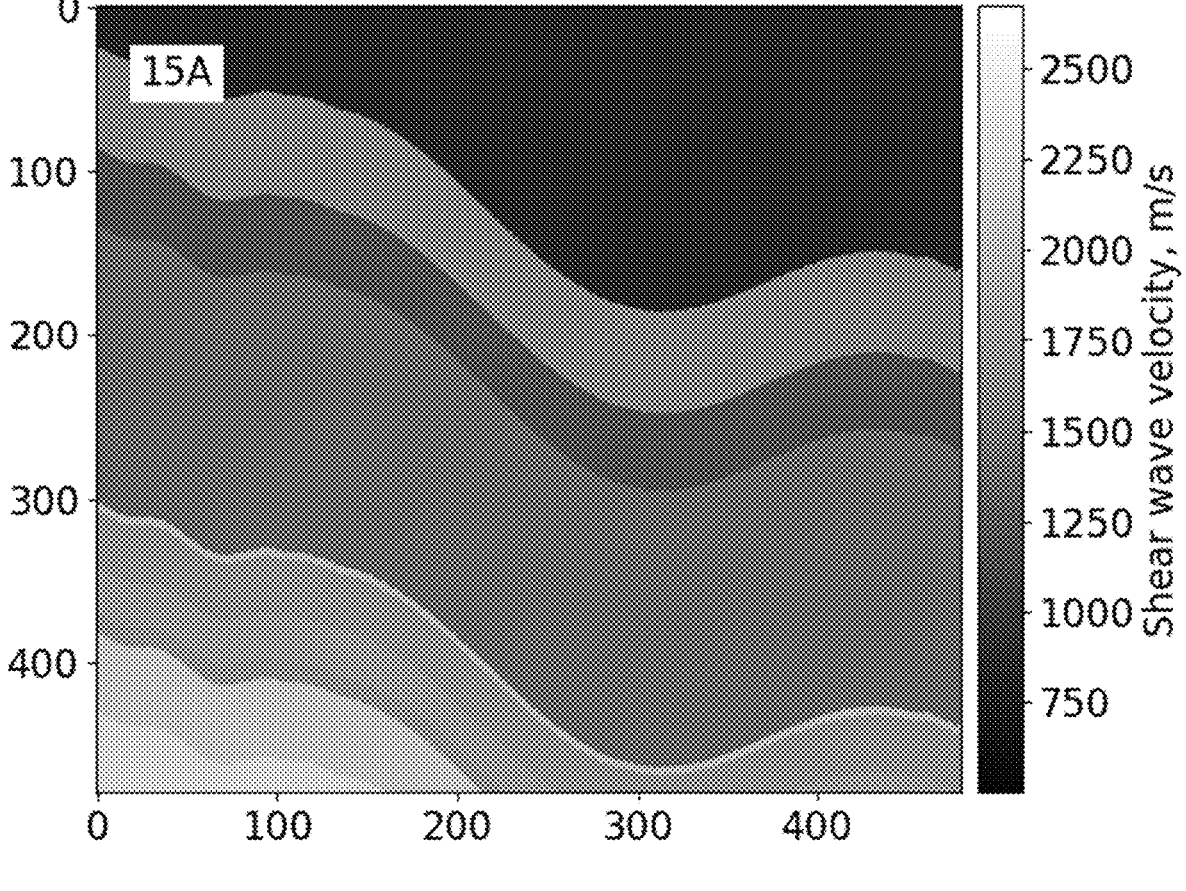
Figure 15B:
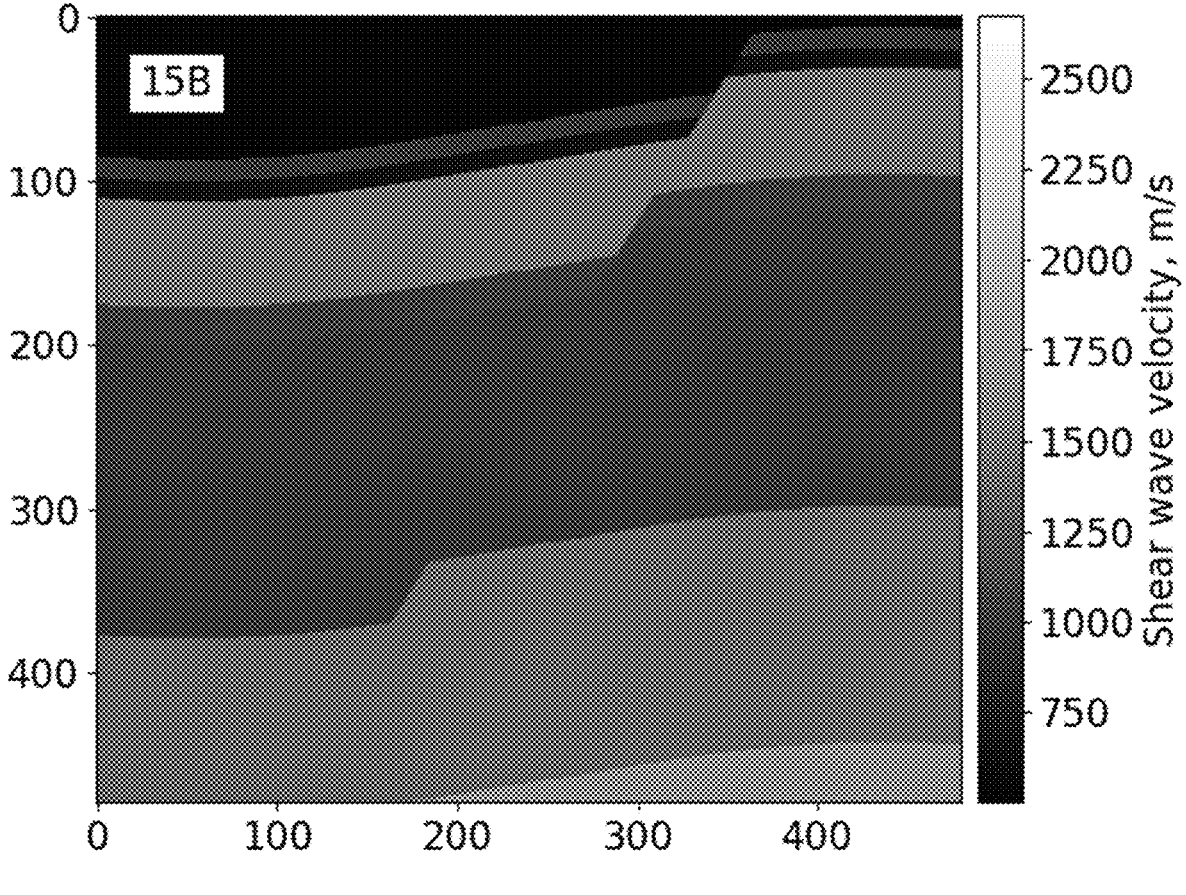
Figure 15C:
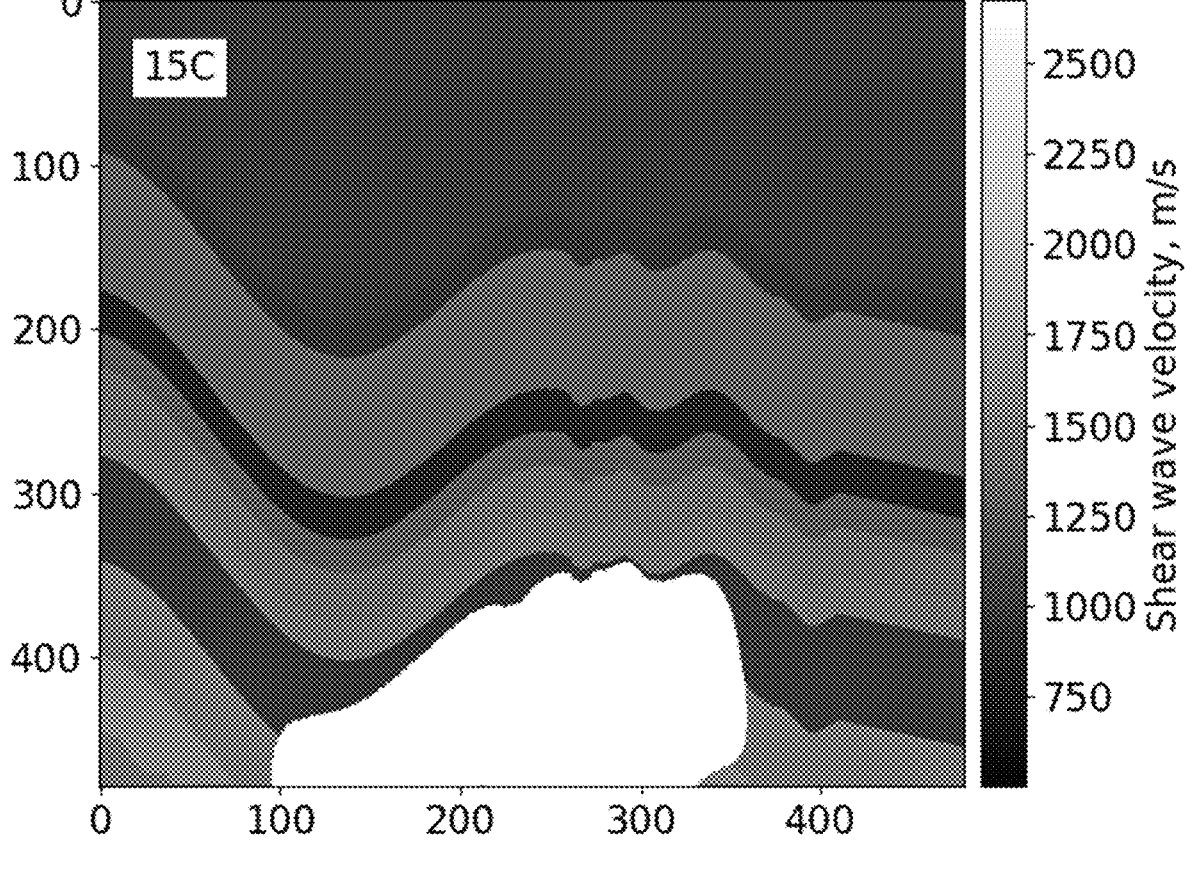
Figure 15D:
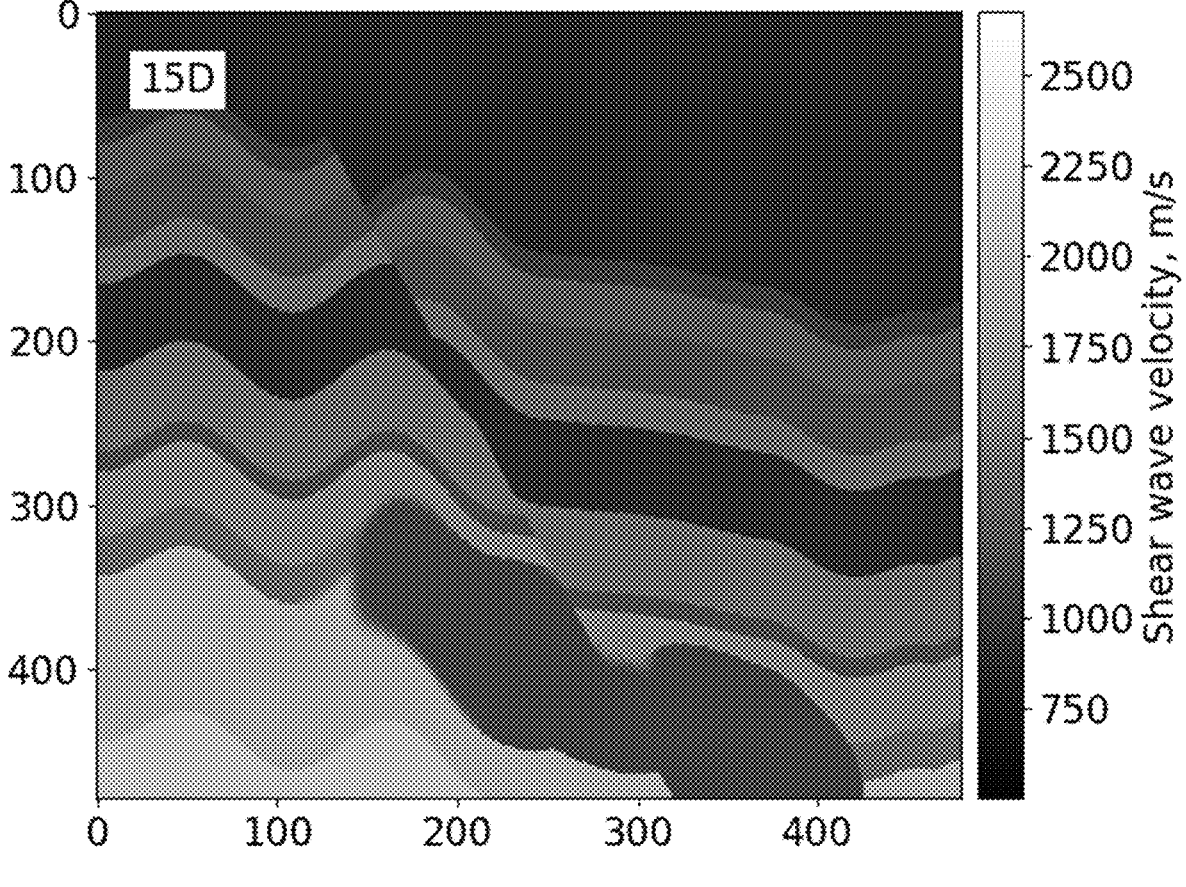

FIGS. 15A-15D illustrates an example selection of shear wave velocity models used for the training of the neural network, featuring four geological scenarios: FIG. 15A) Layered, folded model;

FIG. 15B) Layered with a fault; FIG. 15C) Layered with an irregular geological body; FIG. 15D) Model with both a fault and an irregular geological body.

Figure 16A:
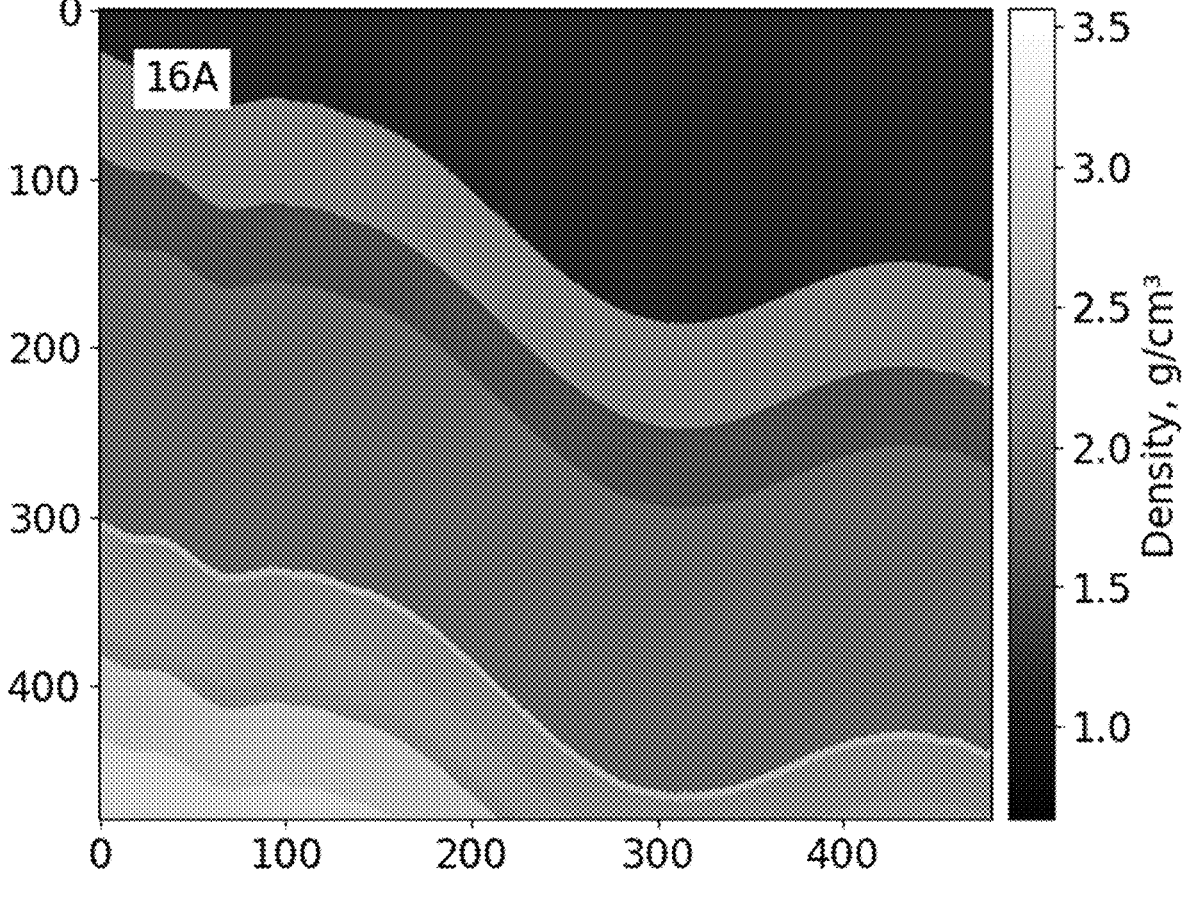
Figure 16B:
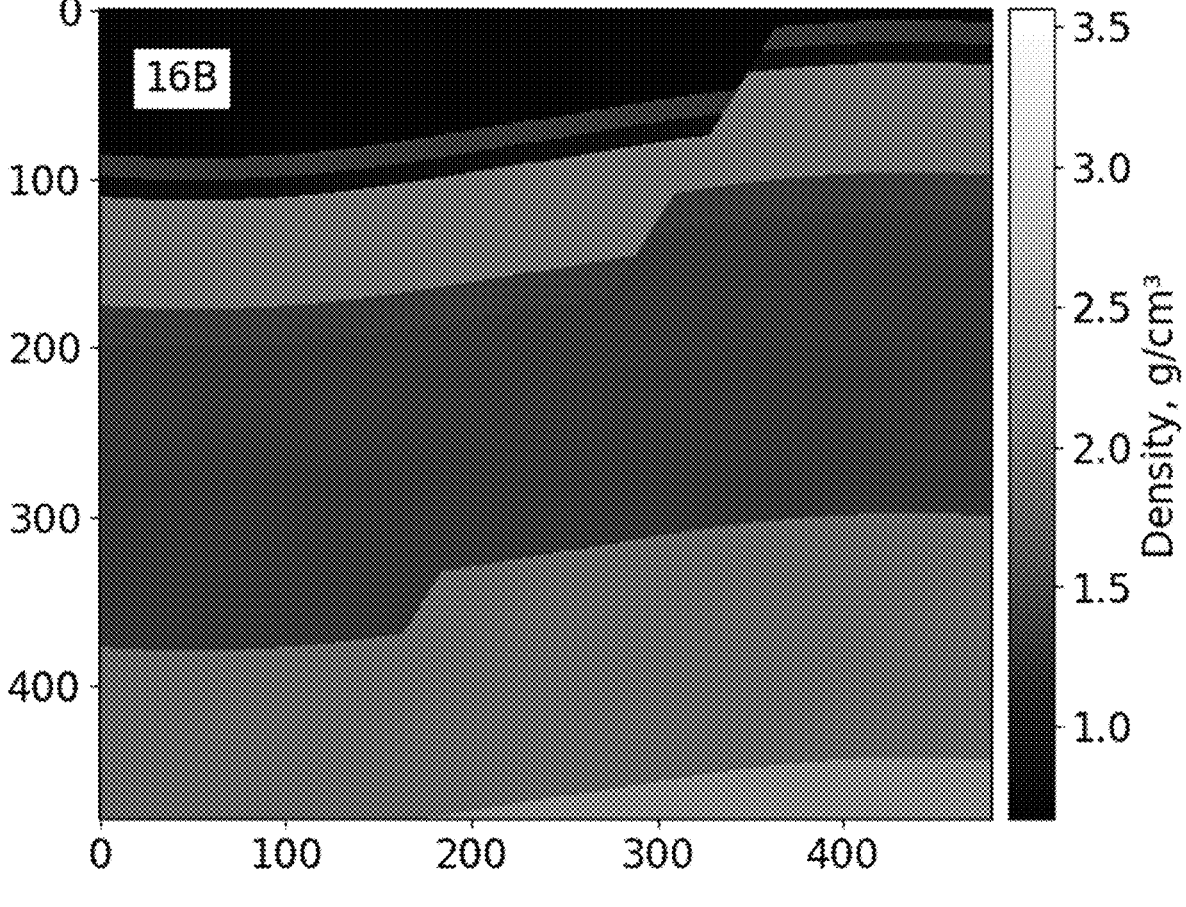
Figure 16C:
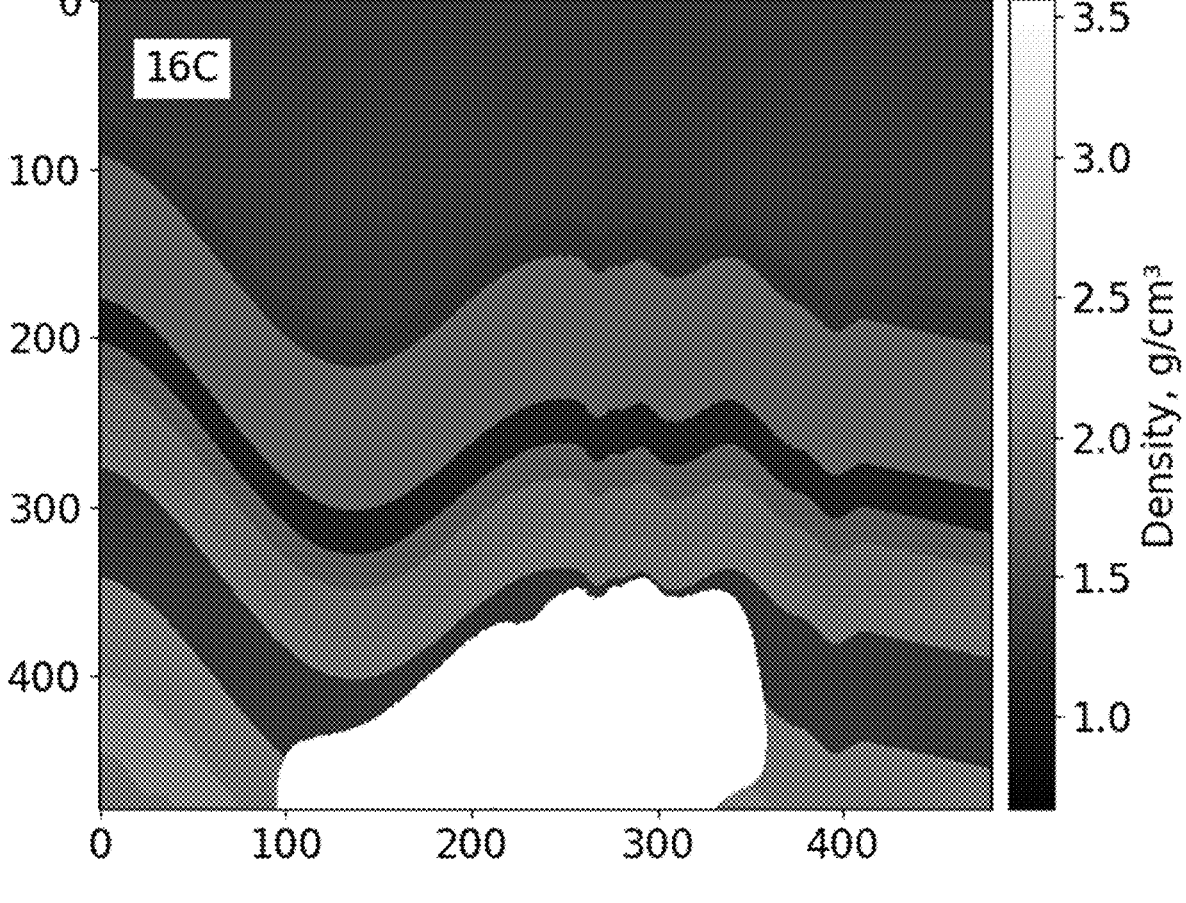
Figure 16D:
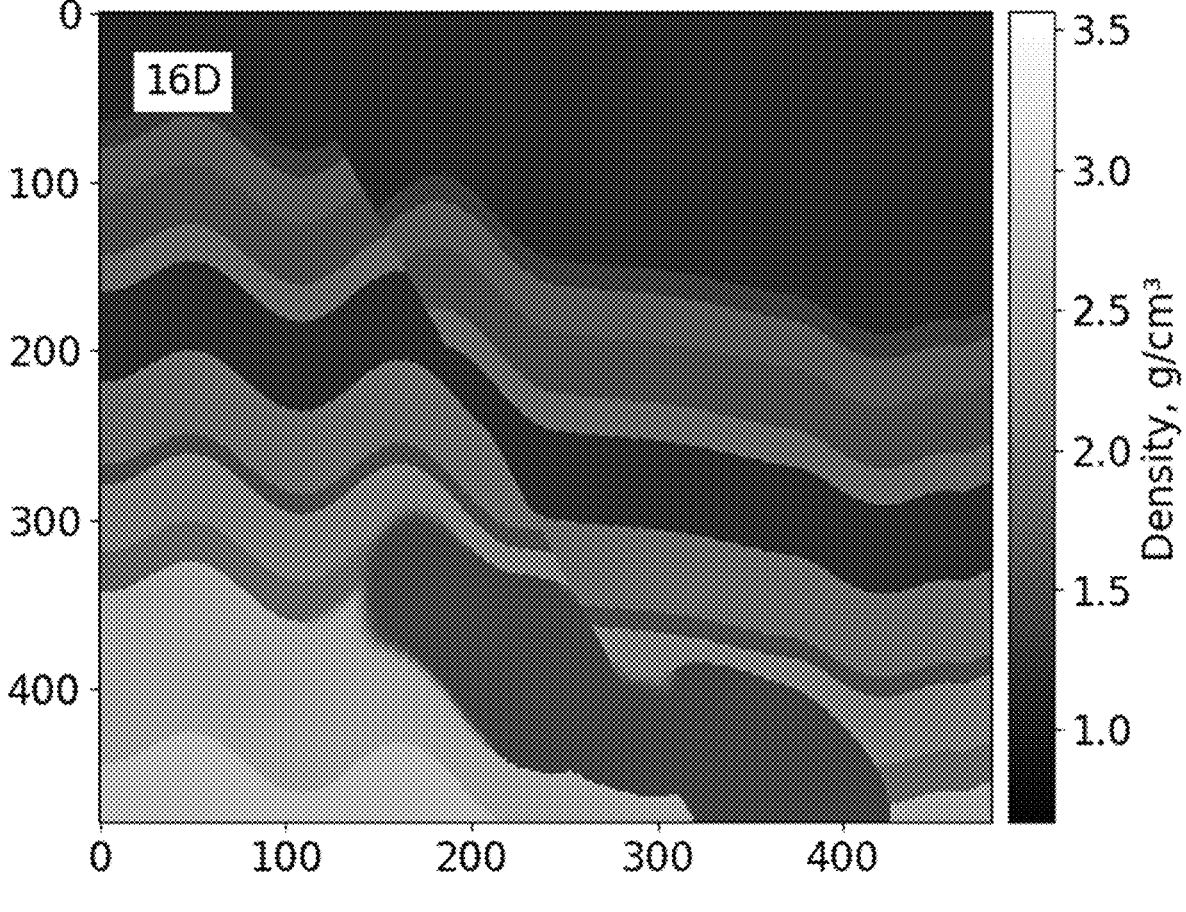

FIGS. 16A-16D illustrates an example selection of density models used for the training of the neural network, featuring four geological scenarios: FIG. 16A) Layered, folded model; FIG. 16B) Layered with a fault; FIG. 16C) Layered with an irregular geological body; FIG. 16D) Model with both a fault and an irregular geological body.

Figure 17:
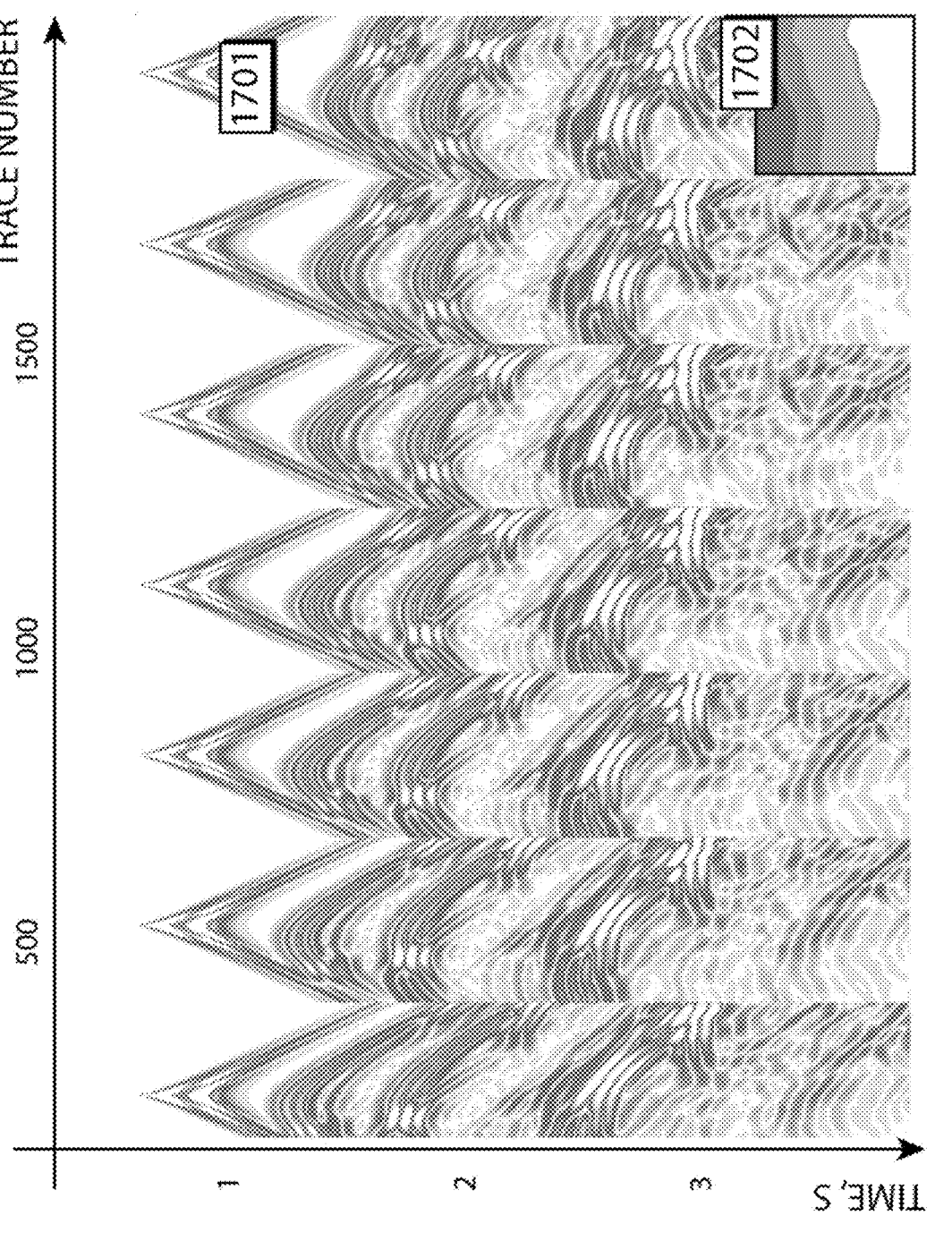

FIG. 17 illustrates an example selection of common shot gathers, generated using finite-difference seismic modeling, alongside their corresponding pressure wave velocity model.

Figure 18:
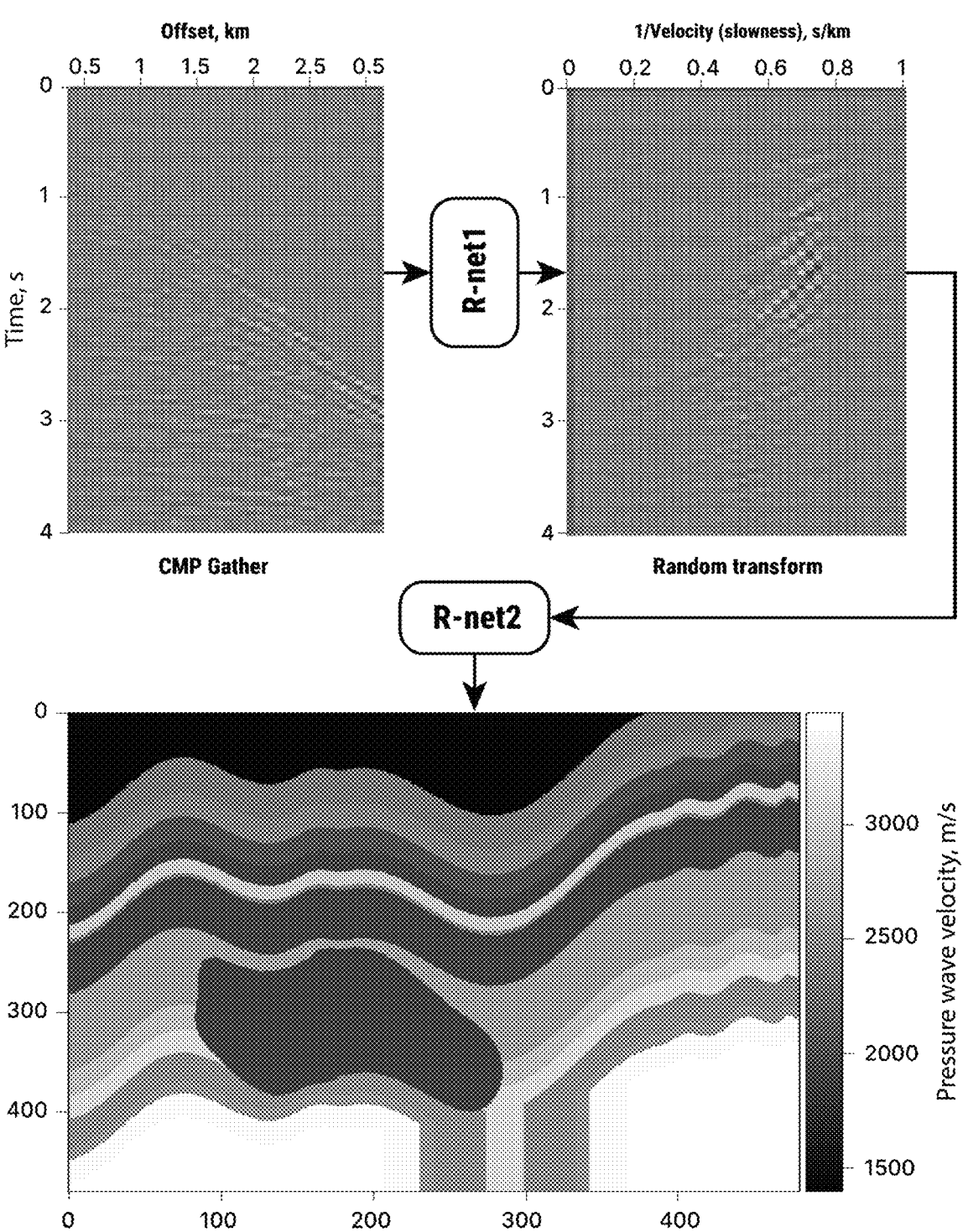

FIG. 18 depicts the schematic workflow of our method: from CMP gathers through R-net1 performing Radon Transform, and R-net2 (both GAN-trained) to yield P-wave, S-wave, and density models.

Figure 19A:
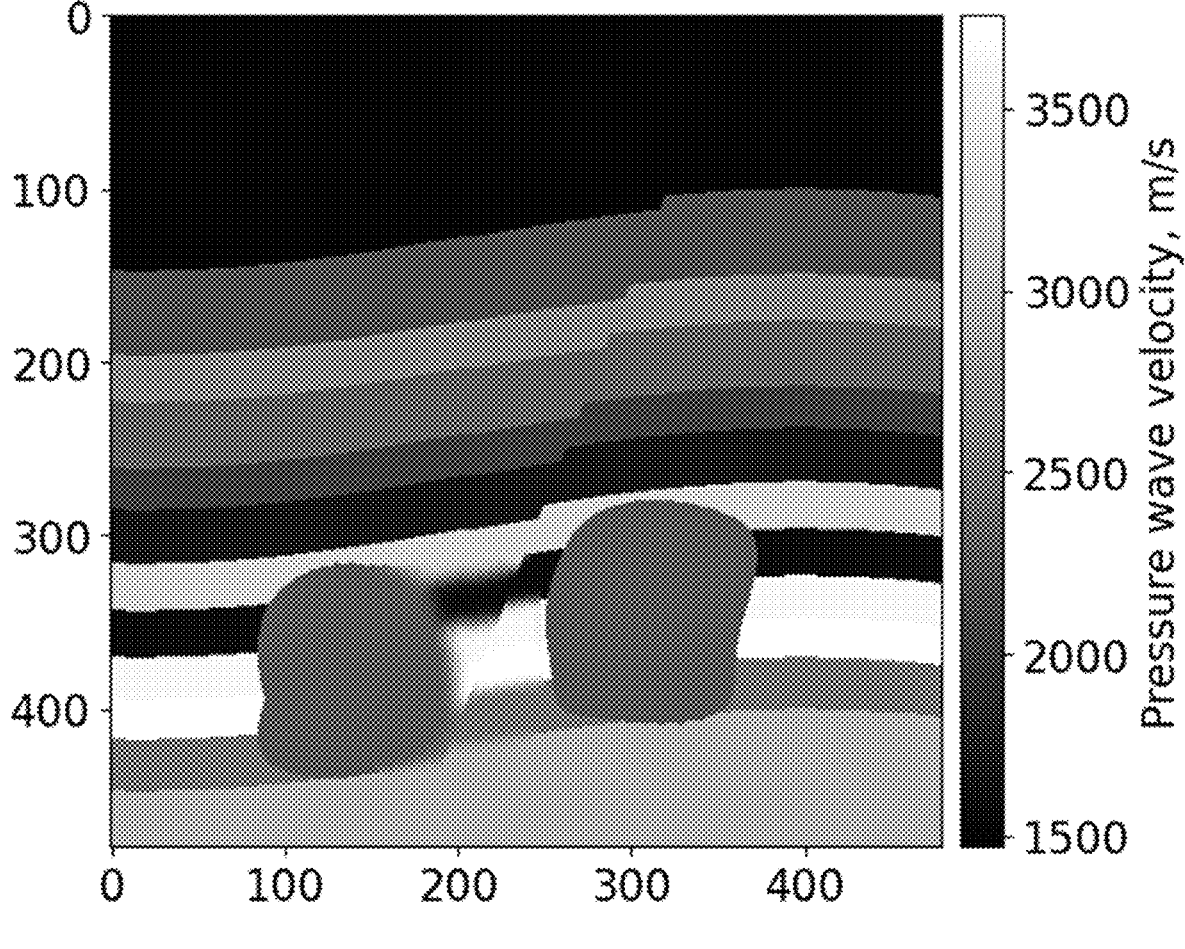
Figure 19B:
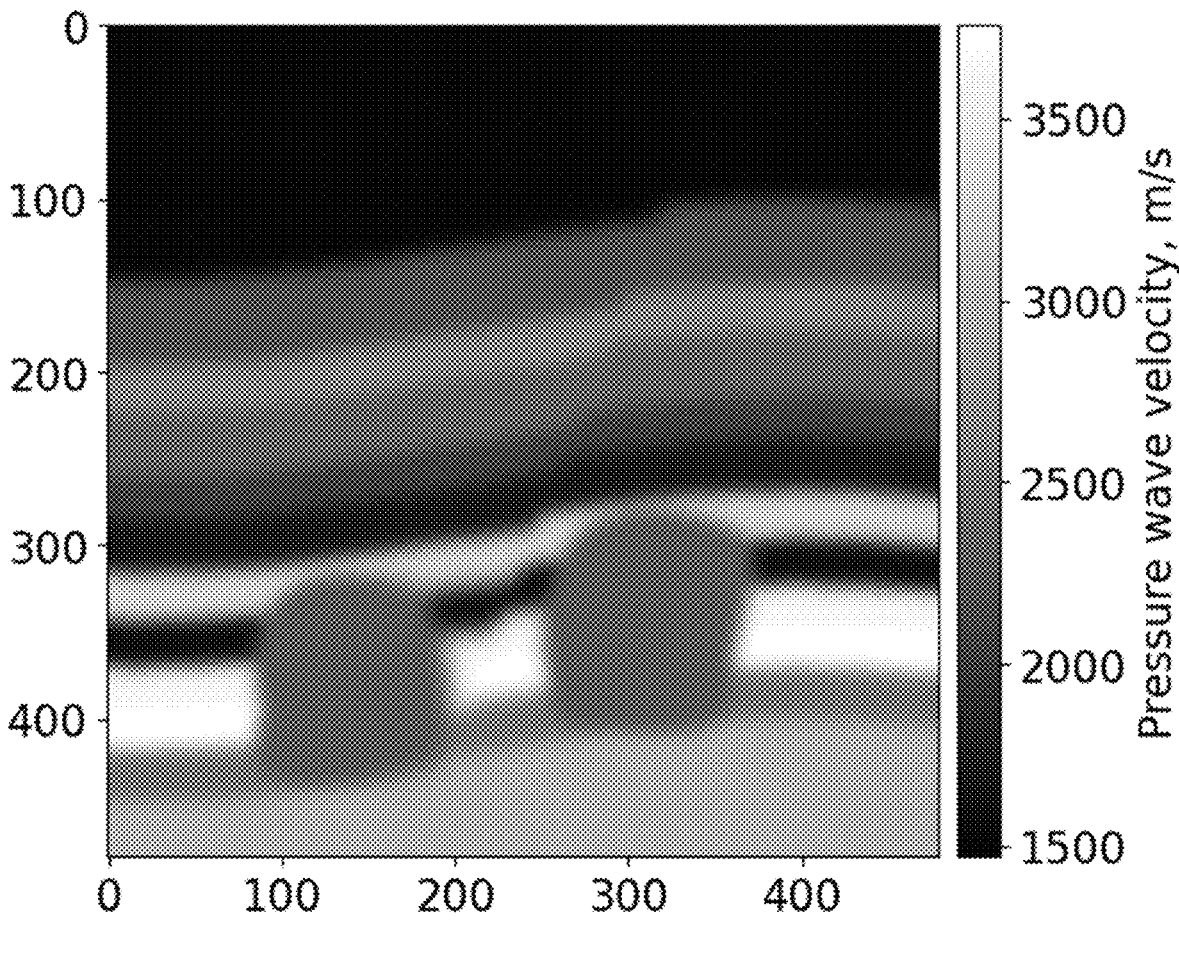
Figure 19C:
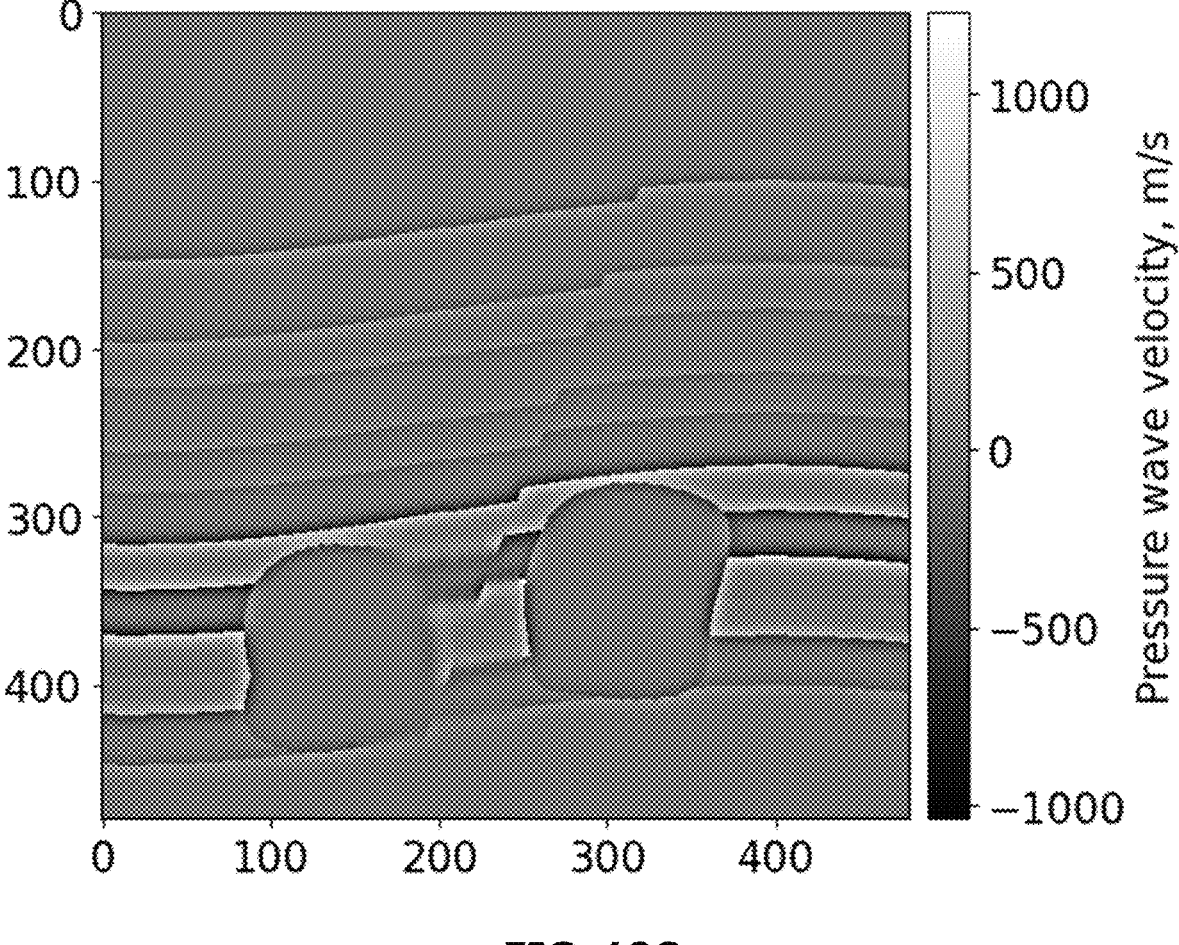

FIGS. 19A-19C illustrates models generated using the proposed approach with R-nets.

Figure 20:
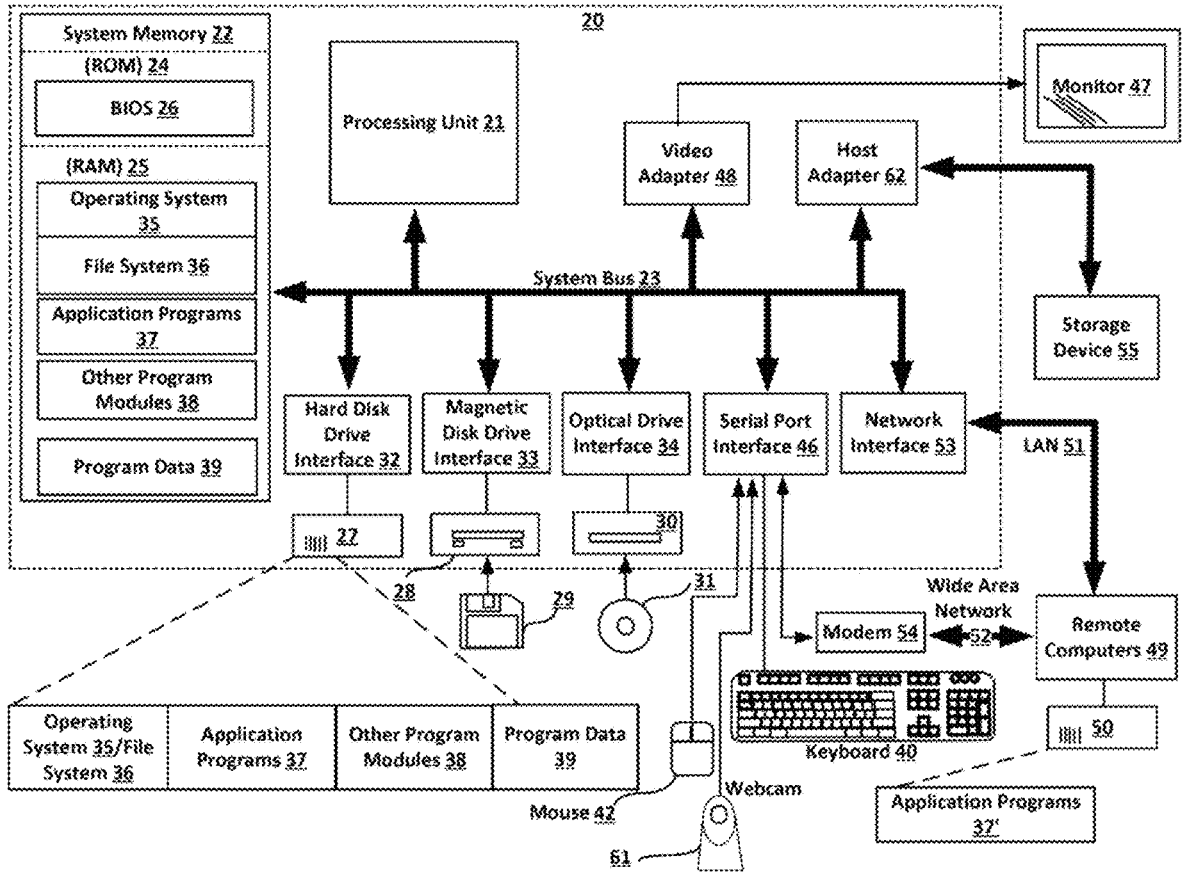

FIG. 20 shows an exemplary system for implementing the invention, such as a host computer or a server.

DETAILED DESCRIPTION OF EMBODIMENTS OF THE INVENTION

Reference will now be made in detail to the preferred embodiments of the present invention, examples of which are illustrated in the accompanying drawings.

Seismic exploration is a geophysical method for studying geological objects using elastic vibrations-seismic waves.

Another embodiment is a system for seismic modeling, comprising a ship or land seismic station including sources and receivers that acquire geophysical data in the form of seismic time-series records; and a non-transitory computer readable storage medium, encoded with instructions, which when executed by the computer causes the computer to provide method for studying geological objects using elastic vibrations—seismic waves.

According to the tasks to be solved, deep, structural, oil and gas, ore, engineering seismic exploration are distinguished. According to the location, oil and gas seismic exploration is subdivided into ground (field), offshore (marine), borehole and underground, and according to oscillation frequencies of the used elastic waves, one can single out a high-frequency (frequencies over 100 Hz), mid-frequency (frequencies of several tens of hertz) and low-frequency (frequencies less than 10 Hz) seismic exploration. The higher the frequency of elastic waves, the greater their attenuation and the less depth of exploration.

The classification of seismic exploration methods is carried out, first of all, according to the classes and types of waves.

In seismic exploration, two main methods are distinguished: the method of reflected waves and the method of refracted waves. The main method of reflected waves is based on the use of waves reflected from the boundaries of media with different acoustic impedance. It is used in the variant of the general depth (middle) point. The amplitude of reflected waves depends on the difference in acoustic stiffness above and below the boundary.

Reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 250 Hz). Seismic data may be processed and interpreted, for example, to understand better composition, fluid content, extent and geometry of subsurface rocks.

In a situation typical for seismic exploration, the medium under study occupies a half-space, the free boundary of which is the earth's surface. The waves excited on this surface or near it, in the course of their propagation, cover one region after another, penetrating into all points of the medium under study. When a wave propagating from the source meets the first boundary on its way, on which the elastic properties of the medium change abruptly, reflected or reflected and refracted (head) and transmitted waves are formed. The reflected and refracted waves return to the earth's surface, while the passing ones go down unhindered until they meet the second boundary on their way. On this border again reflected and, under certain conditions, refracted waves are formed, starting their way to the earth's surface. The described process is repeated for each boundary within the studied stratum, as a result of which all new and new waves: reflected, converted, refracted, and, under appropriate conditions, diffracted. The waves reflected from each boundary travel from the source to the reflection point and from this point to the earth's surface, i.e., twice run through the thickness enclosed between the earth's surface and the reflecting boundary.

In a ground survey, noise may be sensed that can be associated with one or more phenomena. For example, ground roll can be a type of noise that can be coherent noise generated by a surface wave (e.g., a low-velocity, low-frequency, high-amplitude Rayleigh wave). Ground roll may obscure signal and degrade overall data quality; noting that selection of source and geophone arrays, filters and stacking parameters may help to reduce the effect of such noise.

In a marine environment, water-bottom roll may result in a type of noise. Water-bottom roll can include a pseudo-Rayleigh wave traveling along an interface of water and a seafloor (e.g., seabed). Water-bottom roll may present in a survey that utilizes one or more seabed sensors. Another type of noise is referred to as ghosting. A ghost can be a short-path multiple, or a spurious reflection that occurs when seismic energy initially reverberates upward from a shallow subsurface and then is reflected downward, such as at the base of weathering or between sources and receivers and a water/air interface.

Yet another type of noise can be associated with equipment such as sensor equipment. Such noise may be due to environmental conditions (e.g., temperature, wind, waves, radiation, etc.).

As to streamers, noise may occur due to contact with one or more objects. This can be anthropogenic interference (changing the ship's trajectory, Streamer cables may be spooled onto drums for storage on a vessel, which subjects the streamer cables to various contact and bending forces, etc.) or natural (streamer cable bites, ocean debris, etc.).

For example, consider noise associated with damage to a streamer or a component of a streamer (e.g., guides, fins, etc.). Such damage may present as a particular type of noise that if identified via analysis may allow for quality control and/or remedial measures (e.g., mitigation, data cleansing, data filtering, repair of equipment, etc.).

As an example, a machine can acquire seismic data and can process the seismic data via circuitry of the machine, which can include one or more processors and memory accessible to at least one processor. Such a seismic station, such as ship or land station, include one or more interfaces that can be operatively coupled to one or more pieces of equipment, whether by wire or wirelessly (e.g., via wireless communication circuitry).

On the seismic station there is a possibility to perform a fast-track processing to obtain the image of the subsurface. As an example, a seismic image can be in one or more types of domains. For example, consider a spatial and time domain where one dimension is spatial and another dimension is temporal. Such a domain may be utilized for seismic traces that are amplitude values with respect to time as acquired by a receiver of seismic survey equipment. As an example, time may be transformed to depth or other spatial dimension. In such an example, a seismic image can be in a spatial domain with two spatial dimensions.

An image can be a multidimensional construct that is at least in part seismic data-based. For example, a digital camera of a smartphone can process data acquired by a Charge-Coupled Device (CCD) array utilizing a model such that the model and associated values may be rendered to a display of the smartphone.

In seismic imaging, rather than photons, seismic energy is sensed. Further, the amount of data sensed tends to be orders of magnitude greater than that of a digital camera of a smartphone. Yet further, a region "sensed" (e.g., surveyed) is generally not visible to the eye.

General adversarial networks (GAN) are one of the type of generative deep learning model. The main idea of GAN approach is using min-max competition between generator and discriminator models on training stage. During that step training algorithm samples data elements from true distribution (elements of training set) and uses generator to sample fake elements. After that training procedure dispatches samples from previous step to discriminator and its goal to separate them. Competition is to train the generator and the discriminator at the same time. The goal of the generator to learn to generate such good samples that discriminator can't distinguish them from true distribution. The goal of the discriminator is to distinguish samples from the generator and true points from training set. Usually training stops when the discriminator randomly guesses for a long time period. An example of GAN training workflow is presented on FIG. 9.

FIG. 9 shows example graphics of an architecture of a computational framework that can be utilized for processing seismic data. The graphic shows a discriminator network 901 and a generator network 902, which can be neural networks. The Generator network uses real/simulated spectrograms and learn mapping from it to velocity models. The discriminator network 901 operates using a training set 905 and generator output. It takes real images and fake images from generator and gives probability that the image is fake.

Figure 1:
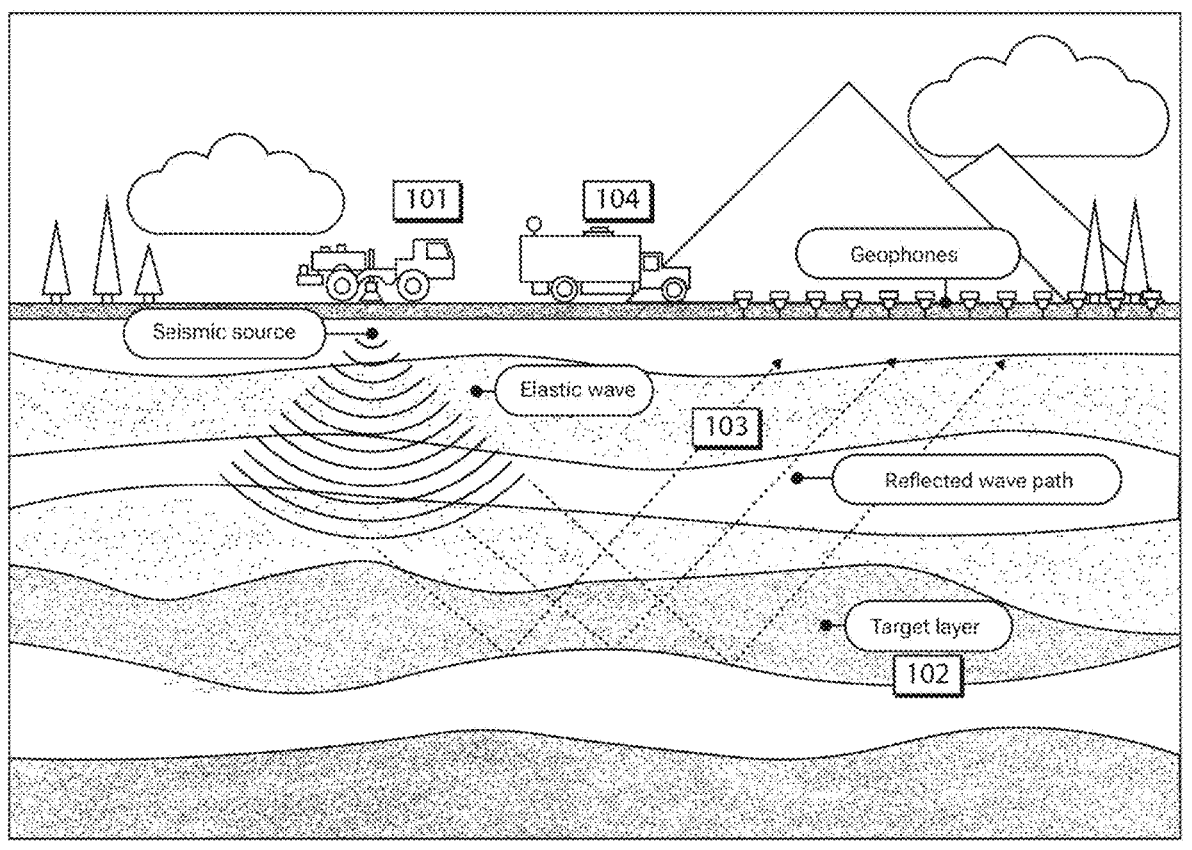
FIG. 1 illustrates an example of land seismic survey.
Figure 2A:
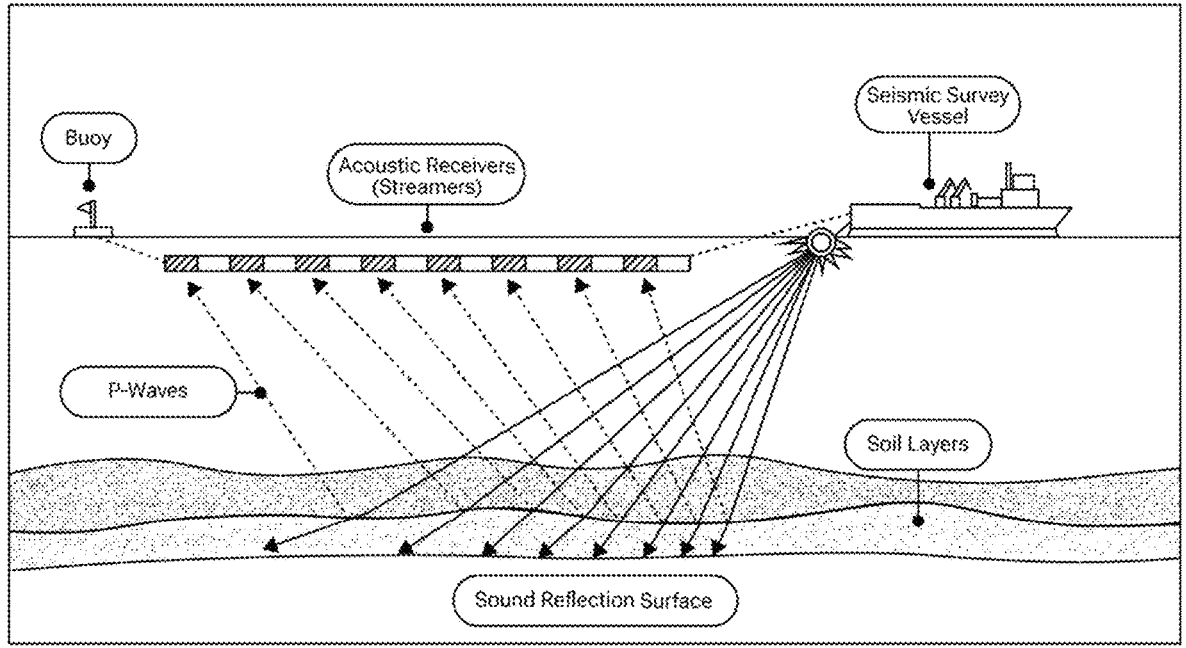
FIGS. 2A, 2B illustrate examples of a marine seismic survey.
Figure 2B:
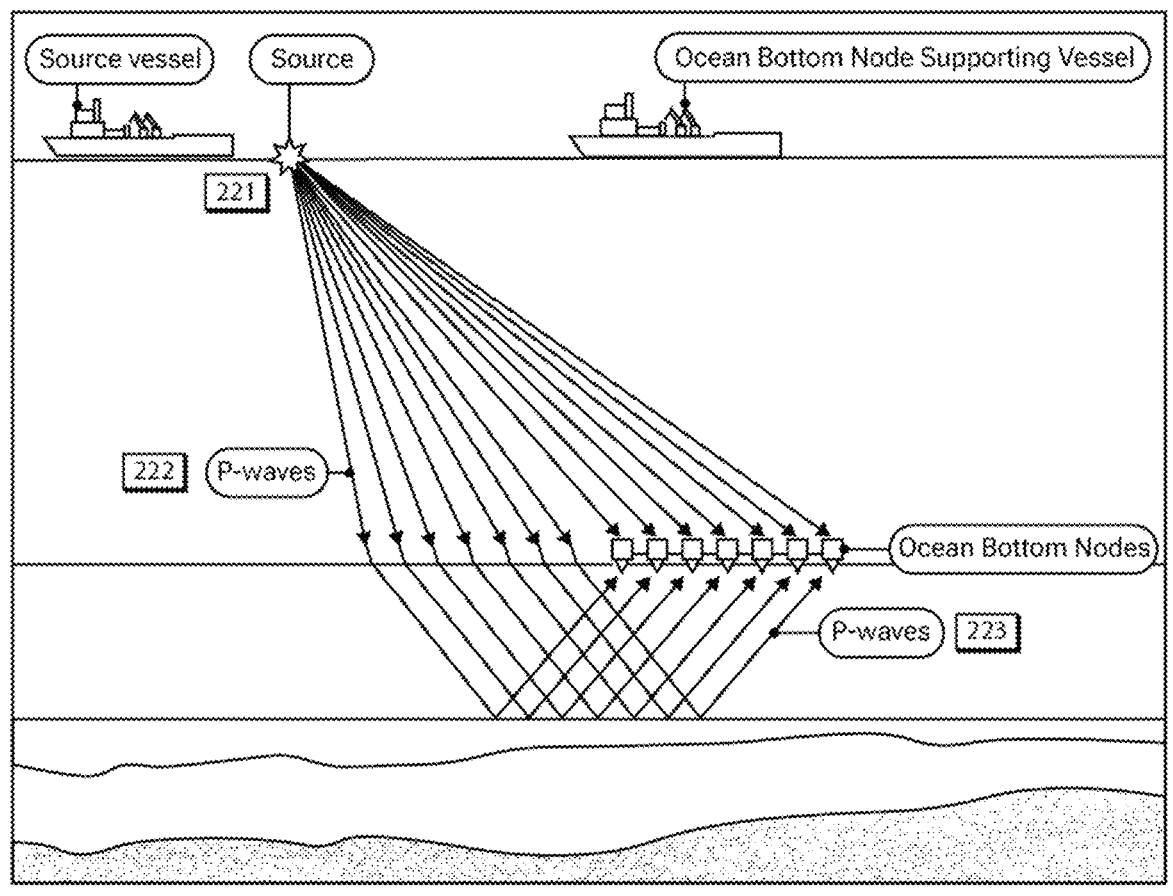
Figure 3A:
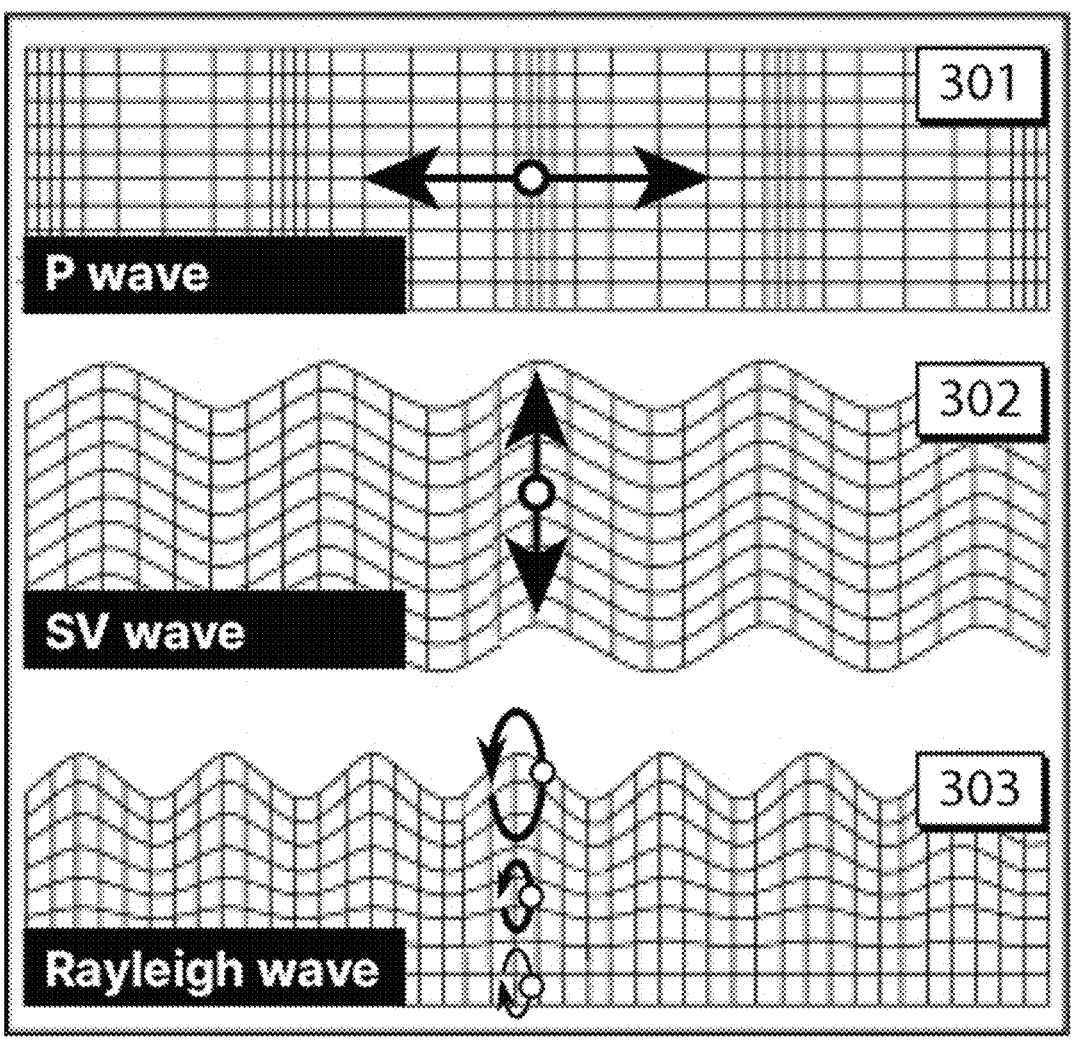
FIGS. 3A, 3B illustrate examples of P-waves, SV-waves, SH-waves, and Rayleigh-waves in both vertical and horizontal planes. Rayleigh-waves exhibit inverse rotation with depth.
Figure 3B:
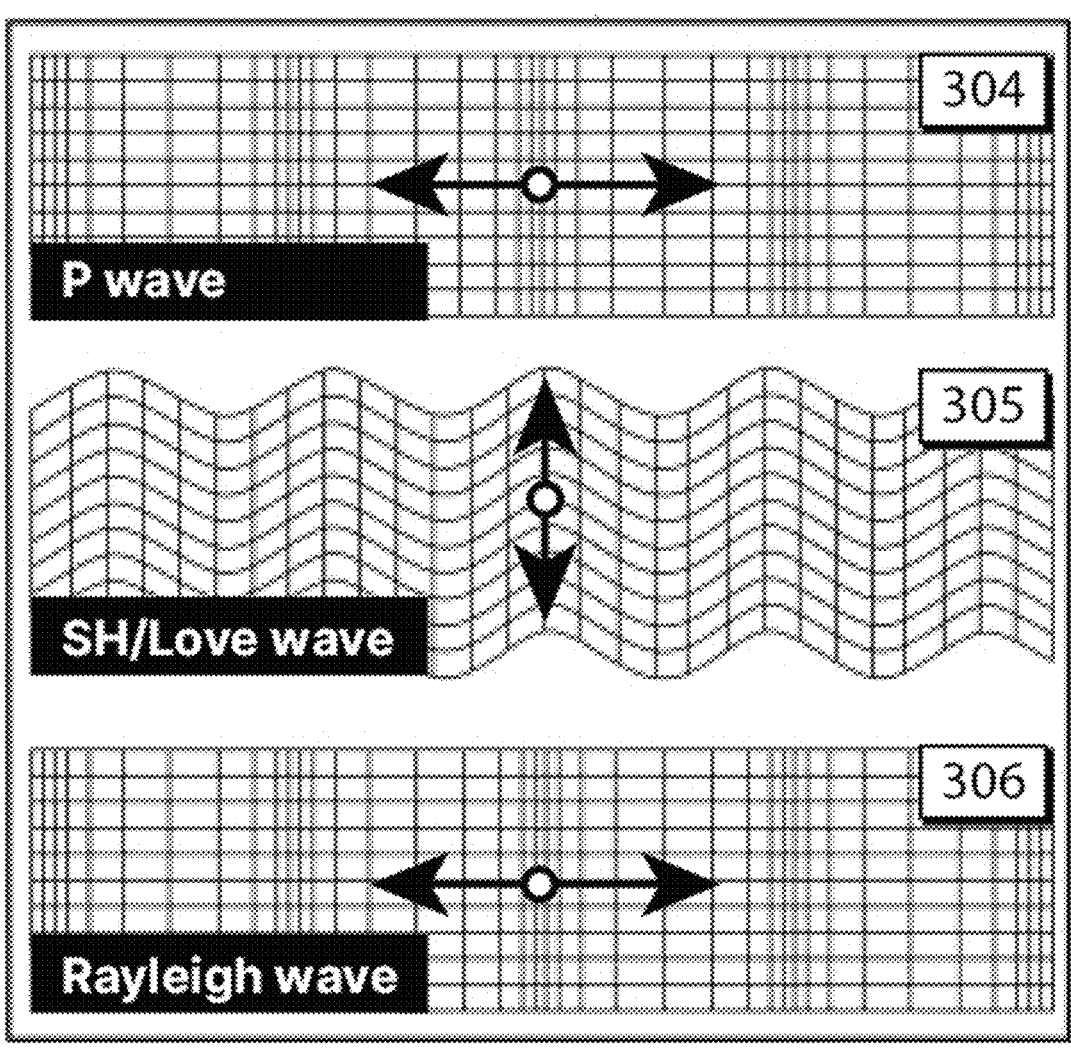

FIGS. 1, 2A, 2B present various examples of equipment and techniques associated with seismic data. One or more of the examples may be utilized in conjunction with one or more GANs. As an example, a computing system may utilize one or more GANs to handle noise, for example, for purposes of attenuation and/or for multiple attenuation.

As an example, interference can exist in one or more types of surveys such as, for example, a land-based survey or a sea-based survey. Interference can be more pronounced where a survey aims to acquire data for deep structures in a geologic environment.

As an example, interference may be a type of noise that can be amenable to handling via a computing system that includes one or more GANs.

FIG. 10 provides an illustration of a series of recorded common shot point gathers, showcasing identified random noise (designated as 1001) and pronounced ground roll (labeled as 1002). This random noise may arise from transient disturbances such as vehicular traffic or from persistent operational machinery, for instance, oil pumps.

The fastest effect for the oil and gas industry, of course, can be obtained with the introduction of digitalization, and on its basis, the use of artificial intelligence directly in the processes of managing the development of hydrocarbon (HC) deposits, building and using permanent models (hydrodynamic, geological, etc.) (FIG. 11).

FIG. 11 Illustrates the process of project development and the amount of accumulated information in the course of project implementation. Stage 1 1101 requires the collection of all available information on the project. At second stage 1102, a project is formed in a geographic information system, in which all geological data on the territory are collected. The third stage 1103 includes the time processing of seismic data. It is necessary to prepare conditioned seismograms for building a depth-velocity model of the environment and depth migration. The fourth stage 1104 involves performing the depth processing. It is at this step that the described full waveform inversion algorithm for subsurface physical property reconstruction, including the velocity of pressure wave propagation, velocity of shear wave propagation, impedance, and density, and using generative deep learning approach algorithm is applied. At stage five 1105 geologists perform structural and dynamic interpretation of the obtained data. At this stage, a large amount of data can be created, which is why this stage requires more careful control than all previous stages. Stage six 1106 includes specific type of work, which could be done optionally during the project, because it requires extra time for project execution.

The impact of research focused on enhancing both the theoretical frameworks and applied methodologies in the field of geological exploration for hydrocarbons is often not fully appreciated. This research is crucial for improving the quality and reliability of various predictive models. These models cover a wide range of parameters, such as the development of oil and gas-bearing strata, lithology, reservoir properties, conditions and criteria for oil and gas presence, and phase composition. Accurate predictions in these areas not only increase the likelihood of successfully discovering hydrocarbon deposits but also provide valuable insights into the operational and economic aspects of future extraction projects. The benefits of incorporating digitalization into geological exploration are manifold. One of the most significant advantages is the ability to accumulate, store, and rapidly process large volumes of data, commonly referred to as 'big data.' This capability leads to several key outcomes: it reduces the time and financial resources required for exploration, enables quicker and more informed managerial decision-making, and enhances the overall productivity of specialists involved in the exploration process.

To date, the software of the oil and gas sector is only slightly related to this topic and is only just beginning to transform under this approach. Mostly all software products have explicit mathematical calculations that underlie seismic data processing procedures. Filtering and adapting the interference field to the observed data is currently the only ultimate solution for accurate processing of seismic data. This approach just adds non-linearity to the processing process, which makes it more advanced (FIG. 12).

FIG. 12 shows a graph, which could be applied to perform a seismic processing. Any seismic data processing graph requires a set of field seismograms 1201. A chain of sequential procedures is performed, which can subsequently be divided into pre-stack 1203 or post-stack 1202 migration processing. The output of both chains is a migrated image of the environment, however, in the case of pre-stack migration, the result is more informative.

The application of deep learning relies heavily on the linearity of relationships between the phases of the process to achieve a result that cannot be explicitly programmed. Also, the non-linearity of the seismic data processing process is also achieved due to the actions of the geophysicist himself, who, in turn, makes non-linear decisions for seismic data processing, performing a wide variety of processing tasks. For example, a workflow for constructing a depth-velocity model of a medium can include up to 100 sequentially performed workflows by a geophysicist, which are aimed at compensating for certain side effects of elastic wave propagation in the medium. And this is only to prepare the data for the seismic data processing stage. The process of building a model can also take months, using a lot of human and supercomputer resources. Our solution aims to achieve robust media characterization using the large experience base we have been able to gather in our research for velocity media characterization (FIG. 13).

FIG. 13 shows a processing scheme of proposed approach for full waveform inversion for seismic data. The process is divided into blocks through which the data must pass. As a result of this workflow, a valid velocity model can be obtained by geophysicists and geologists. The input field shot gathers 1301 are fed to the input to this process. Next, the input data is preprocessed 1302, the geometry is assigned, non-conforming traces are removed, and the amplitude-frequency characteristics of the signal are stabilized over time. At step 3 we can initially produce 1303 pre-final velocity section, which is subsequently checked for conditionality using pre-stack depth migration 1304. After that, the geophysicist evaluates the obtained metrics 1305, transforms the resulting model, and then the neural network uses not only the input seismograms, but also the parameter vector to optimize the output result 1306. The process is then repeated until the user is satisfied with the result.

Modern migration algorithms can use not only isotropic velocities, but also medium anisotropy parameters to more accurately take into account the path of rays in the medium. These parameters can describe VTI, HTI, TTI and Orthorhombic complex media for pre-stack depth migration. First of all, the anisotropy parameters compensate for the vertical divergence of the position of the layers according to the well data and seismic data. Second, they compensate for the long-range non-linearity that occurs during the error in ray path estimation and the beam torsion itself. Our workflow is adept at restoring the anisotropic parameters of the medium. However, it's essential to note that in seismic exploration, these parameters can have a dual interpretation. To accurately recover them, appropriate reflections from the reflecting horizons are required. These reflections enable us to pinpoint the medium's characteristics with high precision. Once isotropic velocity models are derived, they can be transformed into anisotropic models using the retrieved parameters. This process significantly enhances the accuracy of our models, providing a more exact representation of real wave propagation, thereby ensuring superior insights and precision in data interpretation.

For the purposes of training the neural network, a special dataset with a total volume of more than 1 Tb was modeled. This dataset contains 10,000 synthetic seismic models (P-waves velocity, S-waves velocity, density sections) 1920×1920 meters in size (in length and depth) and seismograms modeled on this dataset, with the necessary and sufficient number of sources and receivers per 2D line. The cell size was 4 meters in both directions. Several types of finite difference modeling were employed to obtain a stable solution, applicable across a range of modeling types from acoustic to viscoelastic. Using the elastic equations described above, synthetic measurements of time-series signals were generated with a predefined acquisition geometry. In this geometry, sources and receivers are spread equidistantly in the horizontal direction and positioned 4 meters below the surface. The data were generated for 480 receivers and 29 sources. The source signature for all the sources is a 15 Hz Ricker wavelet (FIGS. 14A-14D, 15A-15D, 16A-16D).

FIGS. 14A-14D showcases a grid of generated pressure-wave velocity models. These models incorporate several geological features essential for velocity section modeling.

Within this grid, four key examples are prominently featured: FIG. 14A) a layered, folded model displaying folding in stratified layers indicative of tectonic activity; FIG. 14B) a layered structure with a fault line, emphasizing the impact of faulting on seismic properties; FIG. 14C) a stratified layout with an irregular geological formation, representing the influence of anomalous structures; and FIG. 14D) a complex scenario combining a fault and an irregular formation in a layered context, showcasing diverse geological interactions. Each example serves to demonstrate the varied effects of geological formations on pressure wave velocity, crucial for accurate subsurface modeling. FIGS. 15A-15D illustrate a grid of generated shear-wave velocity models. Boundary geometries are inherited from pressure-wave velocity models.

FIGS. 16A-16D illustrates a grid of generated density models. Boundary geometries are inherited from pressure-wave velocity models.

The resulting dataset was additionally subjected to an augmentation process in order to generate a large amount of data without additional modeling. The augmentation process was achieved using algorithms for adding noise, implementing gaps in signal registration. These are the most common conditions in the registration of a real seismic signal. The total size of the training sample was 8 terabytes.

FIG. 17 illustrates an array of common shot gather after finite-difference seismic modeling 1701. The registered wavefield is complex enough even for geophysicist. In the bottom part a pressure-wave velocity for this modelling case is presented 1702.

A GAN is an architecture that consists of a generator and a discriminator configured to work against each other. Hence the GAN got the name generative-adversarial.

At a high level, this model can be described as two sub-models that compete with each other, and one of these models (the generator) tries to learn how to trick the other one (the discriminator) in some way.

The proposed approach uses a common method based on the interaction of a generator and a discriminator.

To do this, the generator generates random objects, and the discriminator tries to distinguish these generated objects from real objects from the training set. In the process of learning, the generator generates objects that are more and more similar to the sample, and it becomes more and more difficult for the discriminator to distinguish them from the real ones.

As an example, a GAN-based approach on shots with noise can be utilized to attempt to recreate that noise.

As an example, a method can include generating a noise-free shot. For example, a computing system can be utilized to generate synthetic shots with a real data geometry using, for example, a finite difference modeling (FDM) engine (e.g., or other numerical technique). As an example, by using a velocity model that has been updated through Full Waveform Inversion (FWI) and Reflection Tomography (RT), a computing system can help to ensure that a set of synthetic shots possess the underlying kinematics of real data, for example, without random noise associated with real-world acquisition (e.g., equipment and/or processes). As an example, coherent and/or physically explainable noise, such as multiples, can be modeled, leaving random noise different between two datasets.

A discriminator model can be built according to a Deep Convolutional Generative Adversarial Network (DCGAN) framework. For example, it can take an image, either real or generated, as input, and pass it through a series of convolutional filters, or layers. In such an example, each layer of the network can downsample the image until a final layer is a single value representing the probability of the image being real (e.g., or fake).

The current approach employs a two-stage neural network architecture, consisting of specialized networks R-net1 and R-net2, to perform Full Waveform Inversion (FWI) using the hyperbolic Radon Transform. This novel methodology is designed to efficiently extract and utilize velocity information from CMP-sorted seismograms. Combined employment of the hyperbolic Radon Transform and GAN training in both R-net1 and R-net2 enhances the robustness and accuracy of the subsurface model generation, distinguishing this method from traditional techniques.

The first stage involves R-net1, a neural network trained to execute the hyperbolic Radon Transform on input CMP-sorted seismograms. This operation not only closely matches the hyperbolic trajectories found in reflection events but also extracts valuable RMS velocity data from the seismograms. Importantly, this step reduces the dimensionality of the original seismograms, facilitating easier data manipulation in subsequent stages.

Following the transformation, the Radon images generated by R-net1 are fed into the second neural network, R-net2. This network is designed to construct interval velocity models based on the Radon images. R-net2 essentially transitions from the RMS velocities extracted by R-net1 to more detailed interval velocities, thereby generating a comprehensive velocity model.

Both R-net1 and R-net2 employ a Generative Adversarial Network (GAN) approach, with R-net1 focusing on the extraction of RMS velocities and R-net2 on the construction of full-fledged velocity models. This non-trivial combination of two specialized networks offers a robust and efficient method for FWI.

FIG. 18 provides a schematic illustration of our proposed method, showcasing the dual neural network architecture comprising R-net1 and R-net2. This figure elucidates how the networks learn an inverse mapping of seismic data to generate a comprehensive interval velocity model.

An additional advantage of this approach is the versatility of the hyperbolic Radon Transform itself, which has various other applications in geophysics, such as the suppression of multiple waves. While this is not the focus of the current application, it hints at the broader utility of the method.

The preparation of input seismic data for R-net1 is designed to be flexible and adaptable. The seismograms are formatted with dimensions corresponding to batch size, number of shots, number of receivers, and time stamps. Unlike traditional approaches that are constrained by specific grid sizes and survey details, this method allows for greater freedom due to its use of Radon images, which are independent of survey specifics.

R-net1 employs a Convolutional Neural Network (CNN) architecture tailored for the hyperbolic Radon Transform. The architecture is inspired by U-Net, commonly used in segmentation problems. The output of R-net1 serves as the input for R-net2, effectively reducing the dimensionality of the original seismic data and extracting valuable RMS velocity information.

R-net2, on the other hand, is designed to construct interval velocity models based on the Radon images. It also employs a CNN architecture but focuses on generating detailed velocity models. The architecture is similar to an autoencoder, optimized for the task at hand.

Both R-net1 and R-net2 are trained using a Generative Adversarial Network (GAN) approach. The adversarial loss is employed to train the generator and discriminator pairs in each network. This loss aims to deceive the discriminator with the generator's output while enabling the discriminator to distinguish between true and generated models. Additionally, a reconstruction loss, combining L1 and L2 losses, aids the generator in accurately reconstructing velocities.

The described neural network algorithm is validated on simulated data, with the majority of the data used for training. The flexibility in the input format and the use of Radon images make this approach particularly robust, allowing it to adapt to various survey configurations and grid sizes.

The described neural network algorithm was used for training and validation on simulated data. Most of the simulated data was used for training, all available data was divided in the following proportion, 98% (train dataset), 2%. The following metrics were used on the test sample: L1 loss $((sum(|x_i-y_i|)/n$ (Sum over i from 1 to n) and L2 loss $(sum((x_i-y_i)^{}2)/n$ (Sum over i from 1 to n). Metrics results: L1 loss 299 and L2 loss 1531. Similar results were obtained for the first time at a resolution of 480 by 480 cells. In FIGS. 19A-19C** the results of reconstruction of the velocity model from seismograms are presented.

FIGS. 19A-19D present an example of interval velocity model reconstruction. FIG. 19A displays the true seismic model, FIG. 19B shows the reconstructed model, and FIG. 19C depicts the difference between the two models. For all test cases, mean difference between section has average value 300 m/s. The resulting models accurately represent the layer geometry and geological features of the section, and exhibit minimal differences when compared to the ground truth models. The resulting velocity models can be used for pre-stack depth migration, time to depth conversion and pseudo-imaging using pseudo-impedance calculation and convolution with a seismic wavelet. The applied approach demonstrates high accuracy, necessary and sufficient for the purposes of modern geology.

Based on the obtained solution, the Seismic AI Lab software product was implemented. This product includes an algorithm for deriving velocity section and cubes from 2D and 3D seismic data. The software has a modular system and will be expanded with additional seismic data processing procedures in the future. In case of obtaining a more stable solution to the full waveform inversion problem using deep learning, the algorithm will be improved and replaced with a more advanced one in future versions.

With reference to FIG. 20, an exemplary system for implementing the invention includes a general purpose computing device in the form of a host computer or a server 20 or the like, including a processing unit (CPU) 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the computer 20, such as during start-up, is stored in ROM 24.

The computer or server 20 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the server 20. Although the exemplary environment described herein employs a hard disk (storage device 55), a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk (storage device 55), magnetic disk 29, optical disk 31, ROM 24 or RAM 25, including an operating system 35 (e.g., MICROSOFT WINDOWS, LINUX, APPLE OS X or similar). The server/computer 20 includes a file system 36 associated with or included within the operating system 35, such as the Windows NT™ File System (NTFS) or similar, one or more application programs 37, other program modules 38 and program data 39. A user may enter commands and information into the server 20 through input devices such as a keyboard 40, a webcam 61 and pointing device (e.g., a mouse) 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers. A host adapter 62 is used to connect to the storage device 55.

The server/computer 20 may operate in a networked environment using logical connections to one or more remote computers 49. The remote computer (or computers) 49 may be another personal computer, a server, a router, a network PC, a peer device or other common network node, and it typically includes some or all of the elements described above relative to the server 20, although here only a memory storage device 50 with application software 37' is illustrated. The logical connections include a local area network (LAN) 51 and a wide area network (WAN) 52. Such networking environments are common in offices, enterprise-wide computer networks, Intranets and the Internet.

In a LAN environment, the server/computer 20 is connected to the local network 51 through a network interface or adapter 53. When used in a WAN networking environment, the server 20 typically includes a modem 54 or other means for establishing communications over the wide area network 52, such as the Internet.

The modem 54, which may be internal or external, is connected to the system bus 23 via the serial port interface 46. In a networked environment, the program modules depicted relative to the computer or server 20, or portions thereof, may be stored in the remote memory storage device. It will be appreciated that the network connections shown are merely exemplary and other means of establishing a communications link between the computers may be used.

In conclusion, it is important to say that the resulting solution is stable. The algorithm of our method can be implemented and function both in cloud storages and on personal PCs. Our solution has a number of competitive advantages in comparison with solutions on the market and in the scientific field (to be described in the section claims).

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

BIBLIOGRAPHY

The following documents are incorporated by reference herein in their entirety.
1. Gatys et al. (2015), "*A Neural Algorithm of Artistic Style*," arXiv:1508.06576.
2. Goodfellow et al. (2014), "Generative Adversarial Networks," arXiv:1406.2661.
3. Gulrajani et al. (2017), "*Improved Training of Wasserstein GANs*", arXiv:1704.00028.
4. Isola et al. (2016), "*Image-to-Image Translation with Conditional Adversarial Networks*," arXiv:1611.07004.
5. Arjovsky et al. (2017), "*Wasserstein GAN*," arXiv: 1701.07875.
6. Radford et al. (2015), "*Unsupervised Representation Learning with Deep Convolutional Generative Adversarial Networks*," arXiv:1511.06434v2.
7. Yang et al. (2018), "*Application of optimal transport and the quadratic Wasserstein metric to full-waveform inversion*," GEOPHYSICS, 83(1), R43-R62.
8. Amir Adler, Mauricio Araya-Polo, and Tomaso Poggio. *Deep learning for seismic inverse problems: toward the acceleration of geophysical analysis workflows*. IEEE Signal Processing Magazine, 38(2):89-119, 2021.
9. Carey Bunks, Fatimetou Saleck, S Zaleski, and G Chavent. Multiscale seismic waveform inversion. Geophysics, 60(5):1457-1473, 1995.
10. Carsten Burstedde and Omar Ghattas. *Algorithmic strategies for full waveform inversion: 1D experiments*. Geophysics, 74(6):37-46, 2009.
11. Shihang Feng, Youzuo Lin, and Brendt Wohlberg. *Multiscale data-driven seismic full-waveform inversion with field data study*. IEEE Transactions on Geoscience and Remote Sensing, pp. 1-14, 2021. doi: 10.1109/TGRS.2021.3114101.
12. Qinglong He and Yanfei Wang. *Reparameterized full-waveform inversion using deep neural networks*. Geophysics, 86(1):V1-V13, 2021.
13. Wenyi Hu, Aria Abubakar, and Tarek Habashy. *Simultaneous multifrequency inversion of fullwaveform seismic data*. Geophysics, 74(2): 1-14, 2009.
14. Youzuo Lin and Lianjie Huang. *Building subsurface velocity models with sharp interfaces using interface-guided seismic full-waveform inversion*. Pure and Applied Geophysics, 174(11):4035-4055, 2017. doi: 10.1007/s00024-017-1628-5.
15. Ben Moseley, Tarje Nissen-Meyer, and Andrew Markham. *Deep learning for fast simulation of seismic waves in complex media*. Solid Earth, 11(4):1527-1549, 2020.
16. Alan Richardson. *Generative adversarial networks for model order reduction in seismic fullwaveform inversion*. arXiv preprint arXiv:1806.00828, 2018.
17. Ren'an Rojas-G'omez, Jihyun Yang, Youzuo Lin, James Theiler, and Brendt Wohlberg. *Physics consistent data-driven waveform inversion with adaptive data augmentation*. IEEE Geoscience and Remote Sensing Letters, 2020.
18. Eran Treister and Eldad Haber. *Full waveform inversion guided by travel time tomography*. SIAM Journal on Scientific Computing, 39:S587-S609, 2016.
19. Jean Virieux and St'ephane Operto. An overview of full-waveform inversion in exploration geophysics. Geophysics, 74(6):WCC1-WCC26, 2009.
20. Yue Wu and Youzuo Lin. InversionNet: An efficient and accurate data-driven full waveform inversion. IEEE Transactions on Computational Imaging, 6(1):419-433, 2019.
21. Fangshu Yang and Jianwei Ma. Deep-learning inversion: A next-generation seismic velocity model building method. Geophysics, 84(4):R583-R599, 2019.

What is claimed is:

1. A method of full waveform seismic inversion, comprising:
   storing, in a computer memory, geophysical data in the form of common midpoint (CMP)-sorted seismic time-series records obtained from a seismic survey of a subsurface region;
   employing a two-stage U-Net-like convolutional neural network architecture, that includes neural networks R-net1 and R-net2;
   training R-net1, implemented as a Generative Adversarial Network (GAN), to execute the hyperbolic Radon Transform on the CMP-sorted seismograms, using hyperbolic trajectories found in reflection events, thereby extracting RMS velocity data and reducing a dimensionality of the seismic time-series records;
   training R-net2, implemented as a Generative Adversarial Network (GAN), that processes Radon images that contain RMS velocities of pressure waves in the subsurface region, into a subsurface parameter model; and
   extracting, using a computer, a subsurface parameter model by processing the seismic time-series records using the trained R-net1 and R-net2.

2. The method of claim 1, wherein the geophysical data includes any of onshore seismic data, offshore seismic data, and transition zone seismic data.

3. The method of claim 1, wherein the extracted subsurface parameter model includes velocity of propagation of the pressure waves.

4. The method of claim 1, wherein the seismic time-series records are multi-component, and the extracted subsurface parameter model further comprises one or more of the following parameters: velocity of shear wave propagation, acoustic impedance, or the density of the subsurface region.

5. The method of claim 1, further comprising training the U-Net-like convolutional neural networks with synthetically generated subsurface physical models consistent with prior geological information and simulated geophysical data generated from synthetically generated subsurface parameter models.

6. The method of claim 5, further comprising generating the simulated geophysical data based on any of an acoustic wave equation, an elastic wave equation and coupled acoustic-elastic wave equations, and applying appropriate boundary conditions to the simulated geophysical data.

7. The method of claim 5, further comprising subjecting the simulated geophysical data to an augmentation process to generate an expanded set of data without additional modeling, wherein the augmentation process adds noise and implements gaps in signal registration.

8. The method of claim 7, wherein the training of the R-net1 and R-net2 neural networks includes utilizing a generator neural network that adopts a U-Net-like segmentation model.

9. The method of claim 5, wherein the training of the U-Net-like convolutional neural network uses separate convolutional neural networks as generator and discriminator components within a generative-adversarial approach (GAN).

10. The method of claim 1, further comprising supplementing the training of the U-Net-like convolutional neural network with an additional dataset specifically designed to incorporate prior geological knowledge about the subsurface region;

wherein the additional dataset includes elements well information, stratigraphy, subsurface structural patterns, and/or geophysical property ranges.

11. The method of claim 1, wherein the training of the R-net1 and R-net2 neural networks in the Generative Adversarial Network (GAN) approach is performed using a gradient descent algorithm or a stochastic gradient descent algorithm, to optimize the extraction of RMS velocity data from the CMP-sorted seismograms and the derivation of the velocity models and other subsurface physical property models.

12. The method of claim 1, further comprising using the subsurface parameter model for subsurface interpretation, hydrocarbon exploration, and/or hydrocarbon production process.

13. The method of claim 12, further comprising using the subsurface parameter model for a geophysical imaging process.

14. The method of claim 12, further comprising using the subsurface parameter model as a starting model for a geophysical inversion process.

15. The method of claim 12, wherein the derived subsurface pressure wave propagation velocity models are utilized as inputs for a pre-stack depth migration process, so as to provide imaging of the subsurface structures for geological interpretation and hydrocarbon exploration.

16. The method of claim 12, wherein the subsurface pressure wave propagation velocity models derived are employed in a time-to-depth conversion process, converting the time-based seismic data into a depth-based representation for geological interpretation.

17. The method of claim 1, further comprising providing manual control for the extraction process of the subsurface parameter model by allowing the user to set specific boundary conditions, including a range of model values, a complexity of the model, and a size of an output of the model.

18. A system for full waveform seismic inversion, comprising:

a seismic station including sources and receivers that acquire geophysical data in the form of common midpoint (CMP)-sorted seismic time-series records; and a non-transitory computer readable storage medium, encoded with instructions, which, when executed by a processor, causes the processor to:

store, in a computer memory, geophysical data in the form of common midpoint (CMP)-sorted seismic time-series records obtained from a seismic survey of a subsurface region;

employ a two-stage U-Net-like convolutional neural network architecture, that includes neural networks R-net1 and R-net2;

train the R-net1, implemented as a Generative Adversarial Network (GAN), to execute the hyperbolic Radon Transform on the CMP-sorted seismograms, using hyperbolic trajectories found in reflection events, thereby extracting RMS velocity data and reducing a dimensionality of the seismic time-series records;

train the R-net2, implemented as a Generative Adversarial Network (GAN), that processes Radon images that contain RMS velocities of pressure waves in the subsurface region, into a subsurface parameter model; and extract, using a computer, a subsurface parameter model by processing the seismic time-series records using the trained R-net1 and R-net2.

* * * * *